US010966561B2

(12) United States Patent
Boone et al.

(10) Patent No.: US 10,966,561 B2
(45) Date of Patent: *Apr. 6, 2021

(54) PORTABLE DEVICES FOR PREPARING AND TRANSPORTING BREWABLE BEVERAGES

(71) Applicant: TEAnGO Technologies, Inc., San Diego, CA (US)

(72) Inventors: Alexander Boone, San Diego, CA (US); Raphael Lozano, San Diego, CA (US)

(73) Assignee: TEANGO TECHNOLOGIES, INC., San Francisco, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 15/628,414

(22) Filed: Jun. 20, 2017

(65) Prior Publication Data

US 2017/0280915 A1 Oct. 5, 2017

Related U.S. Application Data

(63) Continuation of application No. 15/184,888, filed on Jun. 16, 2016, now Pat. No. 9,713,399.

(Continued)

(51) Int. Cl.
*A47J 31/00* (2006.01)
*A47J 31/20* (2006.01)
*A47J 43/046* (2006.01)

(52) U.S. Cl.
CPC ............. *A47J 31/005* (2013.01); *A47J 31/20* (2013.01); *A47J 43/046* (2013.01)

(58) Field of Classification Search
CPC ....... A47J 31/005; A47J 31/46; A47J 31/0626

(Continued)

(56) References Cited

U.S. PATENT DOCUMENTS 3,657,994 A 4/1972 Post et al.
6,272,974 B1 8/2001 Pascotti et al.
(Continued)

FOREIGN PATENT DOCUMENTS

CN 201675723 U 12/2010
CN 201905763 U 7/2011
(Continued)

OTHER PUBLICATIONS

PCT/US2016/037929 International Search Report and Written Opinion dated Dec. 8, 2016.
(Continued)

*Primary Examiner* — Phuong T Nguyen
(74) *Attorney, Agent, or Firm* — Kwan & Olynick LLP

(57) ABSTRACT

Disclosed are methods, systems, and devices for portably brewing tea, coffee, or other beverages in a container that regulates the temperature and diffusion during and after brewing. For example, the present technology allows people to prepare and consume tea, coffee and other beverages while on the go. In some aspects, a portable brewing device includes a container having a specialized canister system in the interior of the container that encloses the beverage material and controls the diffusion of water in/out of the canister; an intelligent heating and cooling system to continuously regulate the temperature of water in the device; and a data processing unit in communication with the canister and heating and cooling systems to control operational features and store user-specialized settings for the device.

24 Claims, 29 Drawing Sheets

Related U.S. Application Data

(60) Provisional application No. 62/288,752, filed on Jan. 29, 2016, provisional application No. 62/181,105, filed on Jun. 17, 2015.

(58) Field of Classification Search
USPC ......... 99/275, 288, 280, 287, 295, 299, 300, 99/303, 305, 306, 307, 315, 316, 318, 99/320, 321, 327
See application file for complete search history.

(56) References Cited

U.S. PATENT DOCUMENTS

| | | |
|---|---|---|
| 6,915,733 B1 | 7/2005 | Langbauer et al. |
| 7,594,469 B2 | 9/2009 | O'Connor et al. |
| 8,234,971 B2 | 8/2012 | Cerroni |
| 8,584,576 B2 | 11/2013 | Fogg, I |
| 9,035,222 B2 | 5/2015 | Alexander |
| 2003/0226448 A1* | 12/2003 | Cohen .................. A47G 19/16 99/275 |
| 2010/0186600 A1* | 7/2010 | Lewis .................... A47J 36/32 99/327 |
| 2011/0072979 A1* | 3/2011 | Fogg, IV ............ A47J 36/2466 99/288 |
| 2013/0129871 A1 | 5/2013 | Ye et al. |
| 2013/0263745 A1 | 10/2013 | Bombeck et al. |
| 2014/0042651 A1* | 2/2014 | Kay ...................... D01D 5/18 264/8 |
| 2015/0182059 A1* | 7/2015 | Richardson .......... A47J 31/005 99/302 R |
| 2015/0305551 A1* | 10/2015 | Rosati ..................... A23F 3/18 426/231 |
| 2016/0367072 A1 | 12/2016 | Boone et al. |

FOREIGN PATENT DOCUMENTS

| | | |
|---|---|---|
| EP | 2567642 A1 | 3/2013 |
| WO | WO-2004008925 A1 | 1/2004 |
| WO | WO-2007030533 A1 | 3/2007 |
| WO | WO-2010101658 A2 | 9/2010 |
| WO | WO-2016205561 A2 | 12/2016 |

OTHER PUBLICATIONS

U.S. Appl. No. 15/184,888 Office Action dated Feb. 27, 2017.
U.S. Appl. No. 15/184,888 Office Action dated Nov. 8, 2016.
PCT/US2016/037929 International Preliminary Report on Patentability dated Dec. 28, 2017.

* cited by examiner

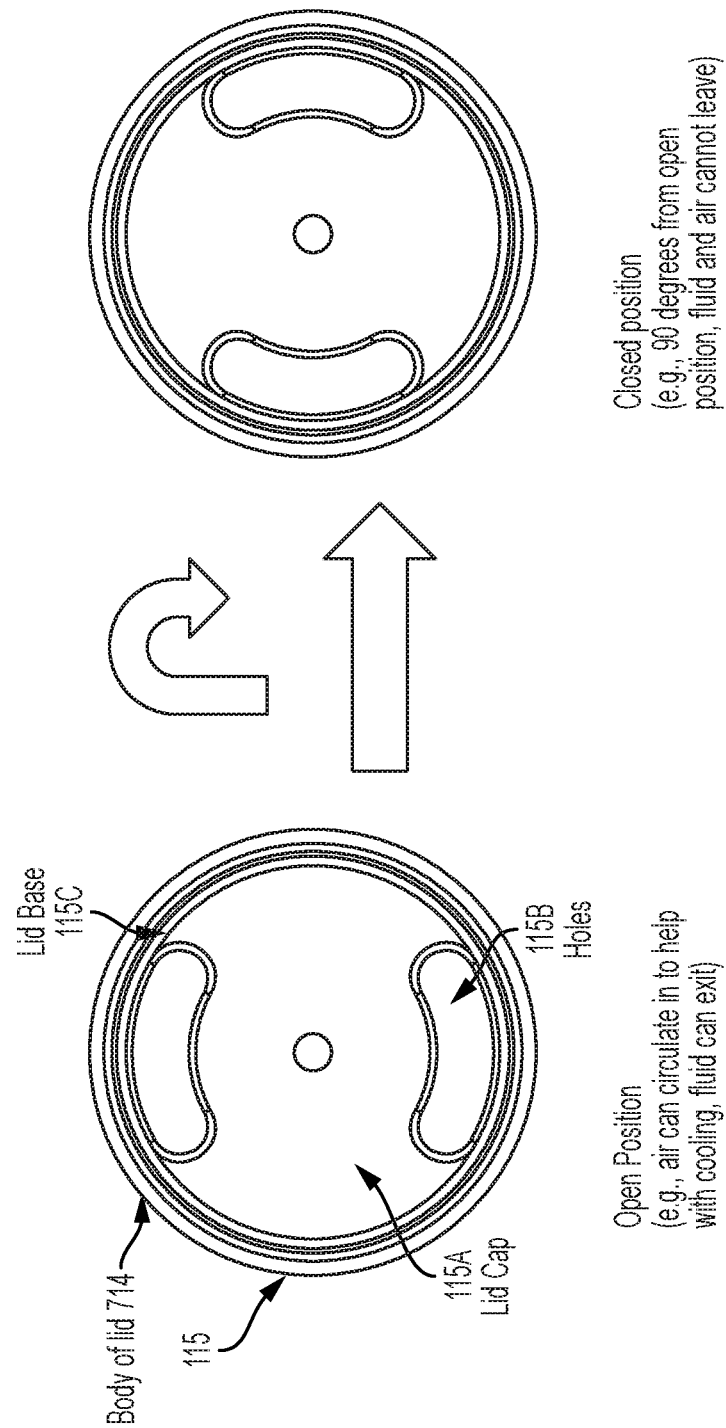

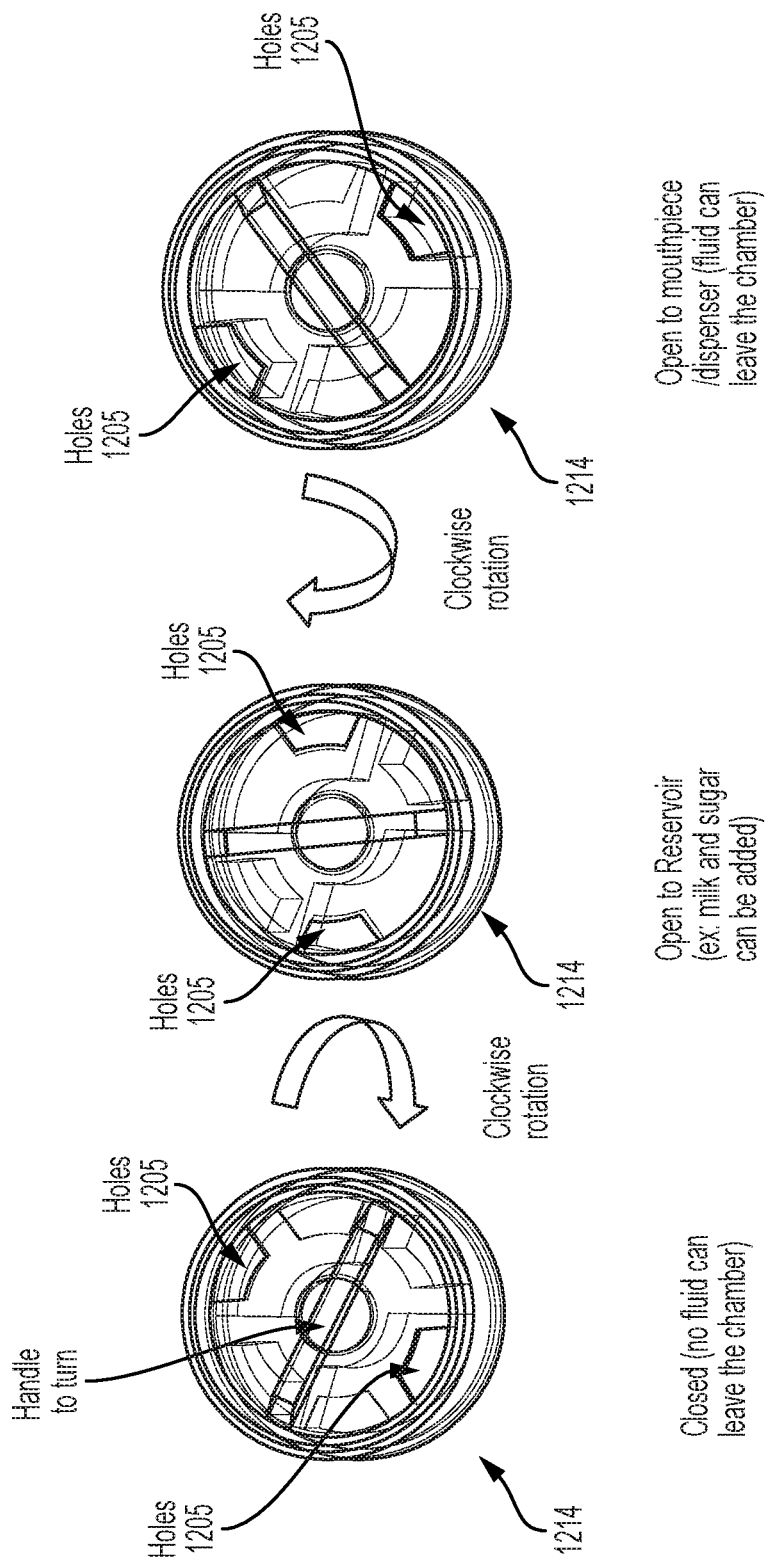

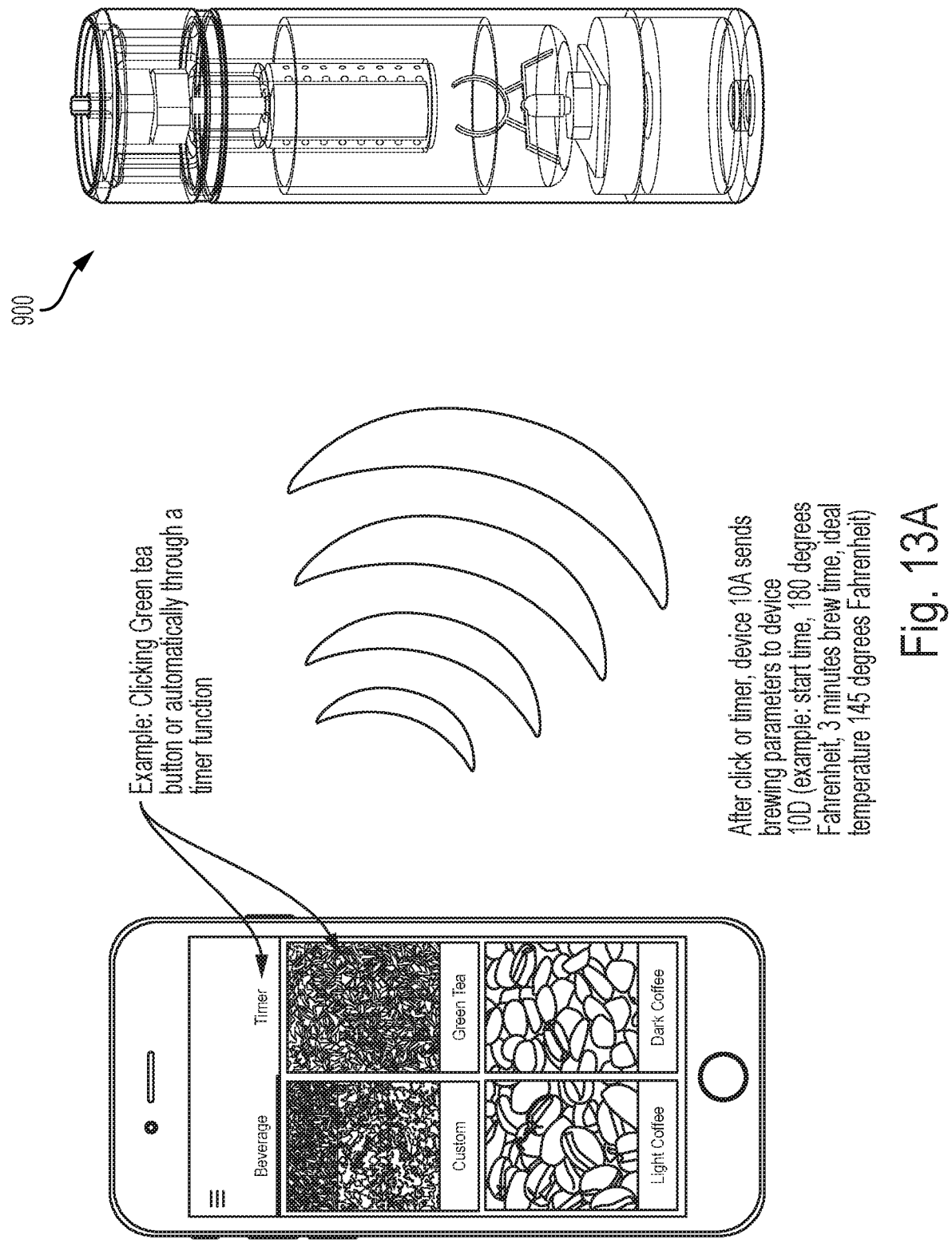

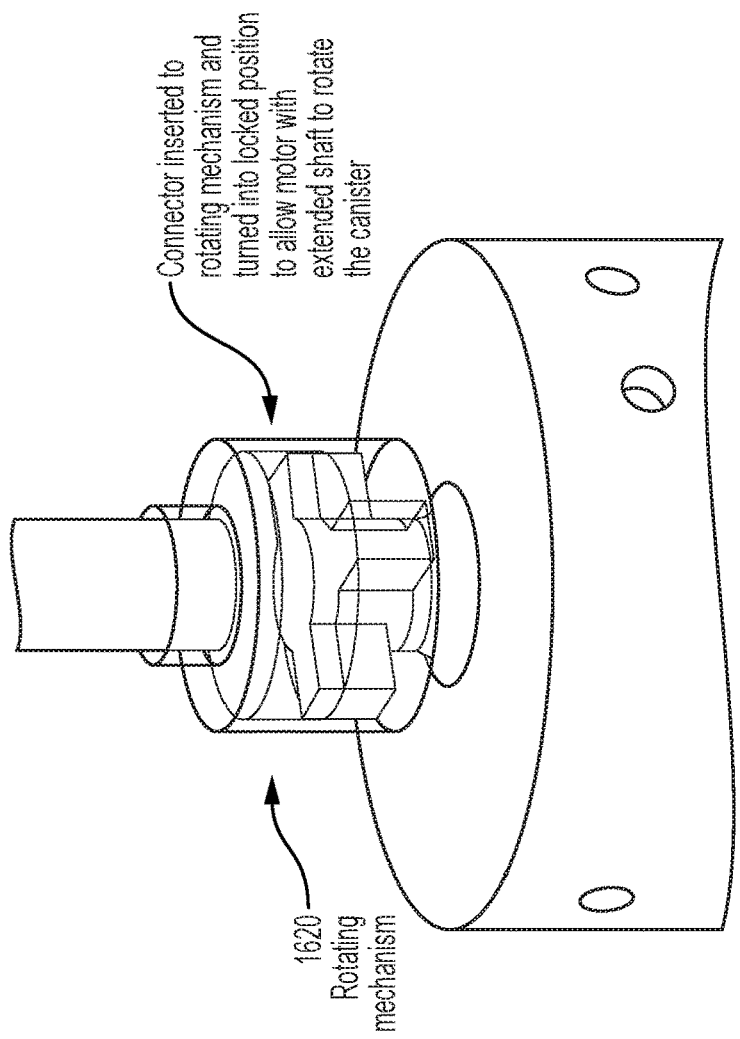
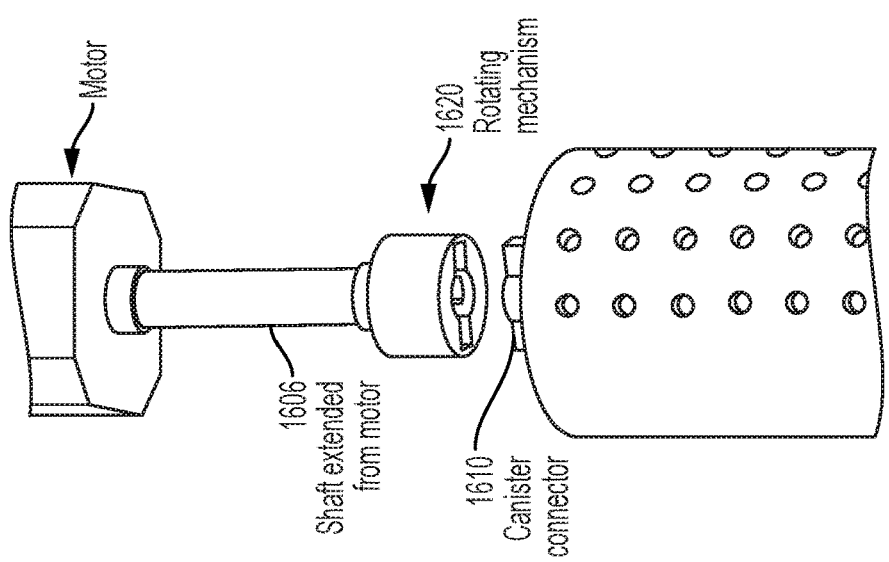

PORTABLE DEVICES FOR PREPARING AND TRANSPORTING BREWABLE BEVERAGES

CROSS-REFERENCE TO RELATED APPLICATIONS

The present application is a continuation of U.S. patent application Ser. No. 15/184,888, filed Jun. 16, 2016, which claims the benefit of U.S. Provisional Application No. 62/288,752, filed on Jan. 29, 2016, and U.S. Provisional Application No. 62/181,105, filed on Jun. 17, 2015, the entire contents of each of which are incorporated herein by reference.

TECHNICAL FIELD

This patent document relates to devices, processes, platforms, systems, and media for brewing beverages.

BACKGROUND

Tea is a beverage that is ubiquitously enjoyed globally. For example, tea is the second most widely consumed beverage in the world, after water. Tea is derived from leaves of the plant *Camellia sinensis*, and can be processed in various ways, with various herbs and other ingredients from many sources, and with various different flavors to produce various types of teas. Typically, tea is brewed or infused using a hot (or in some cases, cold) solvent, such as water, to extract flavors, colors, and aroma from the tea source. People drink tea based on a variety of reasons, e.g., including the health benefits of certain teas, as a stimulant, for the flavor and aromas, and/or based on cultural behaviors. Similarly, coffee is also a ubiquitously enjoyed beverage and is the third most widely beverage in the world after tea. Typically, coffee is brewed or infused in a manner similar to tea and people drink it for similar reasons.

SUMMARY

Methods, systems, devices, platforms, mechanisms, and media are disclosed for portably brewing tea, coffee, or other brewable beverages in a transportable container that regulates the temperature and diffusion during and after brewing.

In one aspect, disclosed herein are brewing canisters for a beverage brewing device, the brewing canisters comprising: an inner canister comprising at least one opening; an outer canister comprising at least one opening; the inner canister positioned at least partially within the outer canister and having a common rotational axis with the outer canister to form a brewing chamber; the inner canister, the outer canister, or both rotatable such that the at least one opening of the inner canister and the at least one opening of the outer canister align in an open position or unalign in a closed position; and an actuator operable to rotate the inner canister, the outer canister, or both to modulate between the open position and the closed position, such that fluid located outside the brewing canister is able to flow in and out of the brewing chamber when in the open position and is unable to flow in and out of the brewing chamber when in the closed position; the brewing canister operable to contain a brewing material in the brewing chamber and regulate fluid flow in and out of the brewing chamber to brew the brewing material. In some embodiments, the brewing canister further comprises connectors for communicating with a data processing unit, the data processing unit including a processor to process data and a memory to store or buffer data. In further embodiments, the actuator comprises a motor or a servo in communication with the data processing unit. In still further embodiments, the actuator comprises a stepper motor. In still further embodiments, the data processing unit is configured to control the motor or servo to modulate between the open position and the closed position. In some embodiments, the actuator includes a lever coupled to the inner canister to allow a user to manually modulate the brewing canister between the open and closed positions. In some embodiments, the brewing canister further comprises connectors for communicating with a temperature sensor to detect a temperature of a fluid in the brewing chamber. In further embodiments, the data processing unit is configured to receive temperature data from the temperature sensor. In some embodiments, the brewing canister further comprises connectors for communicating with a heating unit. In further embodiments, the data processing unit is configured to control the operation of the heating unit. In some embodiments, the brewing canister further comprises connectors for communicating with a cooling unit. In further embodiments, the data processing unit is configured to control the operation of the cooling unit. In some embodiments, the at least one opening of the inner canister, the outer canister, or both the inner canister and the outer canister comprises a set of perforations. In further embodiments, the perforations have a diameter of 1 micrometer to 0.5 millimeter. In other embodiments, the perforations have a diameter of 10 micrometers to 1.5 millimeters. In some embodiments, the actuator rotates the inner canister by 1 degree to 180 degrees to modulate between the open position and the closed position. In further embodiments, the actuator rotates the inner canister by about 90 degrees to modulate between the open position and the closed position.

In another aspect, disclosed herein are portable beverage brewing devices comprising: a container body open at one end and forming an interior chamber configured to contain a fluid; and a brewing canister positioned in the interior chamber, the brewing canister comprising: an inner canister comprising at least one opening; an outer canister comprising at least one opening; the inner canister positioned within the outer canister to form a brewing chamber; the inner canister, the outer canister, or both rotatable such that the at least one opening of the inner canister and the at least one opening of the outer canister align in an open position or unalign in a closed position; and an actuator operable to rotate the inner canister, the outer canister, or both to modulate between the open position and the closed position, such that the fluid is able to flow in and out of the brewing chamber when in the open position and is unable to flow in and out of the brewing chamber when in the closed position; the device operable to contain a brewing material in the brewing chamber and regulate fluid flow between the interior chamber and the brewing chamber to brew the brewing material. In some embodiments, the device further comprises a data processing unit including a processor to process data and a memory to store or buffer data. In some embodiments, the device further comprises a heating unit and the data processing unit is in communication with the heating unit to control the operation of the heating unit to heat the fluid. In further embodiments, the heating unit comprises a Peltier device. In some embodiments, the device further comprises a temperature sensor to detect a temperature of the fluid in the interior chamber. In further embodiments, the data processing unit is configured to receive temperature data from the temperature sensor and regulate the temperature of the fluid based on the detected temperature. In some embodiments, the actuator comprises a motor or a servo in communication with the data processing unit. In further embodiments, the actuator comprises a stepper motor. In further embodiments, the data processing unit is configured to control the motor or servo to modulate the brewing canister between the open position and the closed position. In some embodiments, the device further comprises a display on the exterior of the container body and in communication with the data processing unit, wherein the display is configured to display the temperature of the fluid, the stage of the brewing process, the time remaining in the brewing process, the elapsed time of the brewing process, or a combination thereof. In further embodiments, the display is a touchscreen display. In some embodiments, the brewing canister comprises a cap reversibly attachable to the inner canister to contain the brewing material. In some embodiments, the device further comprises a reversibly attachable lid to cover the opening, the lid including an aperture and an aperture cover to allow the fluid to flow out of the interior chamber when the lid is attached to the container body. In some embodiments, the device further comprises a housing compartment reversibly attachable to the container body, the housing compartment including a hollow interior region to store items within. In some embodiments, the actuator comprises a lever coupled to the inner canister and a knob on the exterior of the container body to allow a user to manually modulate the brewing canister between the open and closed positions. In some embodiments, the device further comprises a cooling unit and the data processing unit is in communication with the cooling unit to control the operation of the cooling unit to cool the fluid. In further embodiments, the cooling unit comprises a spinning apparatus to generate forced convection. In further embodiments, the cooling unit comprises a Peltier device.

In another aspect, disclosed herein are methods of operating a brewing canister of beverage brewing device, the brewing canister comprising: an inner canister comprising at least one opening and an outer canister comprising at least one opening; the inner canister positioned within the outer canister and having a common rotational axis with the outer canister to form a brewing chamber; the inner canister, the outer canister, or both rotatable such that the at least one opening of the inner canister and the at least one opening of the outer canister align in an open position or unalign in a closed position, the method comprising: detecting a temperature of a fluid located outside the brewing canister; and operating an actuator, in response to the temperature of the fluid, the actuator configured to rotate the inner canister, the outer canister, or both to modulate between the open position and the closed position, such that the fluid located outside the brewing canister is able to flow in and out of the brewing chamber when in the open position and is unable to flow in and out of the brewing chamber when in the closed position; provided that the brewing canister is configured to contain a brewing material in the brewing chamber and operation of the actuator regulates fluid flow in and out of the brewing chamber to brew the brewing material. In some embodiments, the operation of the actuator is performed by a data processing unit including a processor to process data and a memory to store or buffer data, wherein the data processing unit is in communication with the actuator to control the operation of brewing canister. In further embodiments, the actuator comprises a motor or a servo in communication with the data processing unit. In still further embodiments, the data processing unit is configured to control the motor or servo to modulate between the open position and the closed position. In some embodiments, detection of the temperature of the fluid is performed by a data processing unit including a processor to process data and a memory to store or buffer data, wherein the data processing unit is in communication with a temperature sensor. In further embodiments, the data processing unit is configured to receive temperature data from the temperature sensor. In some embodiments, operation of the actuator is performed by the data processing unit further in response to a pre-configured brewing start time. In some embodiments, the at least one opening of the inner canister, the outer canister, or both the inner canister and the outer canister comprises a set of perforations. In further embodiments, the perforations have a diameter of 1 micrometer to 0.5 millimeter. In other embodiments, the perforations have a diameter of 10 micrometers to 1.5 millimeters. In some embodiments, operating the actuator comprises rotating the inner canister by 1 degree to 180 degrees to modulate between the open position and the closed position. In further embodiments, operating the actuator comprises rotating the inner canister by about 90 degrees to modulate between the open position and the closed position. In some embodiments, the method further comprises heating the fluid to a brewing temperature. In further embodiments, heating the fluid is performed by a data processing unit including a processor to process data and a memory to store or buffer data, wherein the data processing unit is in communication with a heating unit. In still further embodiments, the data processing unit is in communication with the heating unit to control the operation of the heating unit to heat the fluid. In some embodiments, the method further comprises cooling the fluid to a drinking temperature. In further embodiments, cooling the fluid is performed by a data processing unit including a processor to process data and a memory to store or buffer data, wherein the data processing unit is in communication with a cooling unit. In still further embodiments, the data processing unit is in communication with the cooling unit to control the operation of the cooling unit to cool the fluid.

In another aspect, disclosed herein are methods of brewing a beverage with a brewing device, the method comprising: loading a brewing material into a brewing canister of the brewing device, the brewing canister comprising: an inner canister comprising at least one opening and an outer canister comprising at least one opening; the inner canister positioned within the outer canister and having a common rotational axis with the outer canister to form a brewing chamber configured to contain the brewing material; the inner canister, the outer canister, or both rotatable such that the at least one opening of the inner canister and the at least one opening of the outer canister align in an open position or unalign in a closed position; and an actuator configured to rotate the inner canister, the outer canister, or both to modulate between the open position and the closed position, such that fluid located outside the brewing canister is able to flow in and out of the brewing chamber when in the open position and is unable to flow in and out of the brewing chamber when in the closed position; and providing a brewing protocol executable to operate the actuator to regulate fluid flow into and out of the brewing chamber to brew the brewing material. In some embodiments, the brewing device comprises a data processing unit including a processor to process data and a memory to store or buffer data, wherein the data processing unit is in communication with the actuator to control the operation of the actuator, wherein the data processing unit executes the brewing protocol. In some embodiments, the brewing protocol comprises heating the fluid to a brewing temperature. In further embodiments, heating the fluid is performed by a heating unit and the data processing unit is in communication with the heating unit to control the operation of the heating unit to heat the fluid. In some embodiments, the brewing protocol comprises cooling the fluid to a drinking temperature. In further embodiments, cooling the fluid is performed by a cooling unit and the data processing unit is in communication with the cooling unit to control the operation of the cooling unit to cool the fluid.

In another aspect, disclosed herein are portable beverage brewing platforms comprising: a portable beverage brewing device comprising: a container body open at one end and forming an interior chamber configured to contain a fluid; a brewing canister positioned in the interior chamber, the brewing canister comprising: an inner canister comprising at least one opening and an outer canister comprising at least one opening; the inner canister positioned within the outer canister and having a common rotational axis with the outer canister to form a brewing chamber configured to contain a brewing material; the inner canister, the outer canister, or both rotatable such that the at least one opening of the inner canister and the at least one opening of the outer canister align in an open position or unalign in a closed position; and an actuator configured to rotate the inner canister, the outer canister, or both to modulate between the open position and the closed position, such that the fluid located in the interior chamber is able to flow in and out of the brewing chamber when in the open position and is unable to flow in and out of the brewing chamber when in the closed position; a mobile processor configured to provide a mobile consumer beverage brewing application comprising: a software module presenting a user interface allowing the consumer to select a pre-configured brewing protocol or configure a custom brewing protocol, wherein each brewing protocol comprises a brew temperature and a brew time; and a software module wirelessly transmitting the selected pre-configured brewing protocol or the consumer-configured custom brewing protocol to the portable beverage brewing device to regulate fluid flow to the brewing chamber to brew the brewing material. In some embodiments, the portable beverage brewing device further comprises a data processing unit including a processor to process data and a memory to store or buffer data. In further embodiments, the portable beverage brewing device further comprises a heating unit and the data processing unit is in communication with the heating unit to control the operation of the heating unit to heat the fluid. In still further embodiments, the heating unit comprises a Peltier device. In some embodiments, the portable beverage brewing device further comprises a temperature sensor to detect a temperature of the fluid in the interior chamber. In further embodiments, the data processing unit is configured to receive temperature data from the temperature sensor and regulate the temperature of the fluid based on the detected temperature. In some embodiments, the actuator comprises a motor or a servo in communication with the data processing unit. In further embodiments, the actuator comprises a stepper motor. In further embodiments, the data processing unit is configured to control the motor or servo to modulate the brewing canister between the open position and the closed position. In some embodiments, the portable beverage brewing device further comprises a display on the exterior of the container body and in communication with the data processing unit, wherein the display is configured to display the temperature of the fluid, the stage of the brewing process, the time remaining in the brewing process, the elapsed time of the brewing process, or a combination thereof. In further embodiments, the display is a touchscreen display. In some embodiments, the brewing canister comprises a cap reversibly attachable to the inner canister to contain the brewing material. In some embodiments, the portable beverage brewing device further comprises a reversibly attachable lid to cover the opening, the lid including an aperture and an aperture cover to allow the fluid to flow out of the interior chamber when the lid is attached to the container body. In some embodiments, the portable beverage brewing device further comprises a housing compartment reversibly attachable to the container body, the housing compartment including a hollow interior region to store items within. In some embodiments, the actuator comprises a lever coupled to the inner canister and a knob on the exterior of the container body to allow a user to manually actuate the brewing canister between the open and closed positions. In some embodiments, the portable beverage brewing device further comprises a cooling unit and the data processing unit is in communication with the cooling unit to control the operation of the cooling unit to cool the fluid. In further embodiments, the cooling unit comprises a spinning apparatus to create a vortex in the fluid generating a forced convection. In further embodiments, the cooling unit comprises a Peltier device. In some embodiments, each brewing protocol further comprises a drinking temperature. In some embodiments, each brewing protocol further comprises when a brewing sequence is initiated and a speed of protocol execution. In some embodiments, the portable beverage brewing device further comprises at least one reservoir for controlled release of material into the interior chamber. In further embodiments, each brewing protocol further comprises identification of additional materials to dispense and when additional materials are dispensed. In some embodiments, the portable beverage brewing device further comprises a spinning apparatus in the interior chamber configured to stir the fluid. In further embodiments, each brewing protocol further comprises when a spinning apparatus is initiated, the speed of a spinning apparatus, and the length of time of a spinning apparatus operates. In some embodiments, the plurality of pre-configured brewing protocols comprise brewing protocols pre-configured for tea, light coffee, and dark coffee. In some embodiments, the application further comprises a software module presenting a user interface allowing the consumer to schedule a start time for the selected pre-configured brewing protocol or the consumer-configured custom brewing protocol. In further embodiments, the start time is a recurring start time.

In another aspect, disclosed herein are computer-implemented systems comprising: a digital processing device comprising: at least one processor, an operating system configured to perform executable instructions, a memory, and a computer program including instructions executable by the digital processing device to create a consumer beverage brewing application comprising: a software module presenting a user interface allowing the consumer to select a pre-configured brewing protocol from a plurality of pre-configured brewing protocols, each pre-configured brewing protocol comprising a brew temperature and a brew time; a software module presenting a user interface allowing the consumer to configure a custom brewing protocol, the interface comprising elements for the consumer to input values for a brew temperature and a brew time; and a software module wirelessly transmitting the selected pre-configured brewing protocol or the consumer-configured custom brewing protocol to a portable beverage brewing device; provided that the transmitted brewing protocol is effective to operate the portable beverage brewing device. In some embodiments, the plurality of pre-configured brewing protocols comprise brewing protocols pre-configured for tea, light coffee, and dark coffee. In some embodiments, the software module presenting a user interface allowing the consumer to configure a custom brewing protocol comprises elements for the consumer to input values for a drinking temperature. In some embodiments, the software module presenting a user interface allowing the consumer to configure a custom brewing protocol comprises elements for the consumer to input values for when a brewing sequence is initiated and a speed of protocol execution. In some embodiments, the software module presenting a user interface allowing the consumer to configure a custom brewing protocol comprises elements for the consumer to input values for identification of additional materials to dispense and when additional materials are dispensed. In some embodiments, the software module presenting a user interface allowing the consumer to configure a custom brewing protocol comprises elements for the consumer to input values for when a spinning apparatus is initiated, the speed of a spinning apparatus, and the length of time of a spinning apparatus operates. In some embodiments, the application further comprises a software module presenting a user interface allowing the consumer to schedule a start time for the selected pre-configured brewing protocol or the consumer-configured custom brewing protocol. In further embodiments, the start time is a recurring start time.

In another aspect, disclosed herein are non-transitory computer-readable storage media encoded with a computer program including instructions executable by a processor to create a consumer beverage brewing application comprising: a software module presenting a user interface allowing the consumer to select a pre-configured brewing protocol from a plurality of pre-configured brewing protocols, each pre-configured brewing protocol comprising a brew temperature and a brew time; a software module presenting a user interface allowing the consumer to configure a custom brewing protocol, the interface comprising elements for the consumer to input values for a brew temperature and a brew time; and a software module wirelessly transmitting the selected pre-configured brewing protocol or the consumer-configured custom brewing protocol to a portable beverage brewing device; provided that the transmitted brewing protocol is effective to operate the portable beverage brewing device. In some embodiments, the plurality of pre-configured brewing protocols comprise brewing protocols pre-configured for tea, light coffee, and dark coffee. In some embodiments, the software module presenting a user interface allowing the consumer to configure a custom brewing protocol comprises elements for the consumer to input values for a drinking temperature. In some embodiments, the software module presenting a user interface allowing the consumer to configure a custom brewing protocol comprises elements for the consumer to input values for when a brewing sequence is initiated and a speed of protocol execution. In some embodiments, the software module presenting a user interface allowing the consumer to configure a custom brewing protocol comprises elements for the consumer to input values for identification of additional materials to dispense and when additional materials are dispensed. In some embodiments, the software module presenting a user interface allowing the consumer to configure a custom brewing protocol comprises elements for the consumer to input values for when a spinning apparatus is initiated, the speed of a spinning apparatus, and the length of time of a spinning apparatus operates. In some embodiments, the application further comprises a software module presenting a user interface allowing the consumer to schedule a start time for the selected pre-configured brewing protocol or the consumer-configured custom brewing protocol. In further embodiments, the start time is a recurring start time.

In yet another aspect, disclosed herein are devices for brewing a beverage that comprise a container body structured to include an opening at one end to an interior chamber inside the container body to contain a fluid; a brewing canister located in the interior chamber and structured to include an inner canister and an outer canister each including openings, in which the inner and outer canisters are operable to rotate such that the openings align in an open position of the brewing canister or unalign in a closed position of the brewing canister; a heating unit to generate heat into the interior chamber; and an actuator to rotate one or both of the inner canister and outer canister to the open position and the closed position, such that when fluid is contained in the interior chamber, the fluid is able to flow in and out of the brewing canister when in the open position and is unable to flow in and out of the brewing canister when in the closed position, in which the device is operable to store a solid substance in the brewing canister and control fluid flow to brew the solid substance.

In yet another aspect, disclosed herein are devices for brewing a beverage that comprise a container body structured to include an opening at one end to an interior chamber inside the container body to contain a fluid; a brewing canister located in the interior chamber and structured to include an inner canister and an outer canister each including openings, in which the inner and outer canisters are operable to rotate such that the openings align in an open position of the brewing canister or unalign in a closed position of the brewing canister; a heating unit to generate heat into the interior chamber; a cooling unit to cool the fluid in the interior chamber; and an actuator to rotate one or both of the inner canister and outer canister to the open position and the closed position, such that when fluid is contained in the interior chamber, the fluid is able to flow in and out of the brewing canister when in the open position and is unable to flow in and out of the brewing canister when in the closed position, in which the device is operable to store a solid substance in the brewing canister and control fluid flow to brew the solid substance.

In yet another aspect, disclosed herein are portable beverage brewing devices comprising: a container body open at one end and forming an interior chamber configured to contain a fluid; a data processing unit; a heating unit in communication with the data processing unit to heat the fluid; a spinning apparatus in the interior chamber in communication with the data processing unit and configured to stir the fluid, cool the fluid, or both stir the fluid and cool the fluid; and a brewing canister positioned in the interior chamber, the brewing canister comprising: an inner canister comprising at least one opening; an outer canister comprising at least one opening; the inner canister positioned within the outer canister to form a brewing chamber; the inner canister, the outer canister, or both rotatable such that the at least one opening of the inner canister and the at least one opening of the outer canister align in an open position or unalign in a closed position; and an actuator in communication with the data processing unit and operable to rotate the inner canister, the outer canister, or both to modulate between the open position and the closed position, such that the fluid is able to flow in and out of the brewing chamber when in the open position and is unable to flow in and out of the brewing chamber when in the closed position; the device operable to contain a brewing material in the brewing chamber and regulate fluid flow between the interior chamber and the brewing chamber to brew the brewing material. In some embodiments, the portable beverage brewing device further comprises a cooling unit in communication with the data processing unit to cool the fluid. In some embodiments, the portable beverage brewing device further comprises a display on the exterior of the container body in communication with the data processing unit. In further embodiments, the display is a touchscreen display. In some embodiments, the portable beverage brewing device further comprises at least one reservoir in communication with the data processing unit for controlled release of material into the interior chamber. In further embodiments, the release of the material is controlled by a valve or solenoid in communication with the data processing unit.

The subject matter described herein is optionally implemented in specific ways that provide one or more of the features described herein. By way of example, the disclosed portable brewing technology allows users to add and store water and brewing materials separately, and initiate brewing of the tea, coffee, or other brewing materials anywhere and anytime. The disclosed portable brewing technology provides control of flow of fluid (e.g., water, etc.) using a specialized canister, heating, cooling, and sealing to brew the beverage (e.g., tea, coffee, etc.) in a user convenient, portable, durable device. Importantly, the portable brewing technology disclosed herein stores fluid and brewing materials separately to control when brewing starts, but does this in a space-efficient manner to further the portability and/or decrease the size of a brewing device employing the portable brewing technology. This is achieved by storing the brewing material in a canister that is submerged in the fluid in which water cannot initially flow in, but that precisely controls contact between the fluid and the brewing material (e.g., via controlled flow of the fluid in/out of the canister) by controlling movement of components of the canister. By way of further example, to brew the beverage, a user can simply activate a brewing sequence to initiate heating and brewing of the beverage, e.g., by push of a button. In some implementations, the user further activates a sequence to cool the beverage. By way of still further example, in some embodiments, the portable brewing device includes safety features, such as an external display that optionally alerts the user to the current temperature, or the programmed drinking temperature of the brewed beverage.

BRIEF DESCRIPTION OF THE DRAWINGS

FIG. 7B shows an illustrative schematic diagram of a lid of the exemplary portable brewing device shown in FIG. 7A.

FIGS. 12A-12D show an illustrative schematic diagram of an example embodiment of a lid that can store substances like sugar and milk and is attachable to various embodiments of the portable brewing device in accordance with the present technology.

FIG. 13A shows an exemplary illustration of an app operating on the user's smartphone sending brewing instructions to a portable brewing device to control the brewing protocol.

FIGS. 16A and 16B show an illustrative schematic diagram of an example embodiment of the brewing canister connecting to a rotating mechanism.

DETAILED DESCRIPTION

Figure 1A:
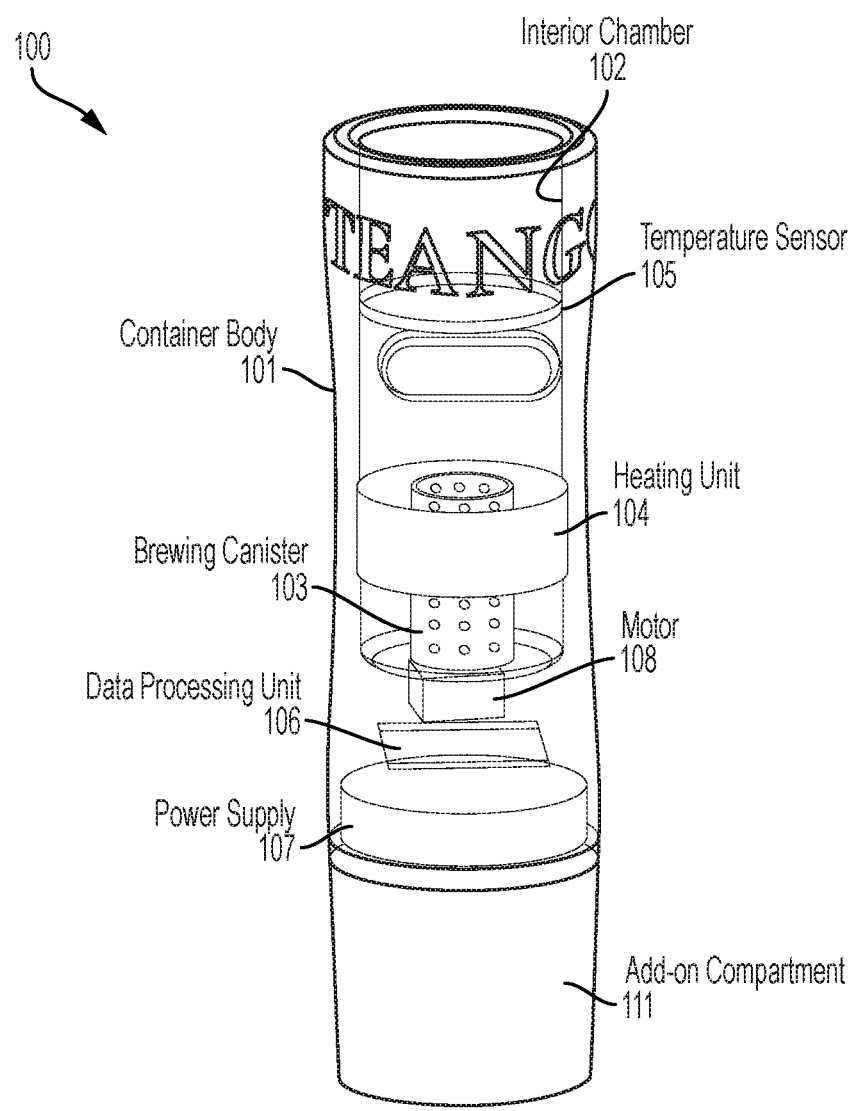
FIG. 1A shows an illustrative schematic diagram of an exemplary portable brewing device in accordance with the disclosed technology.

Tea and coffee are beverages enjoyed virtually everywhere. Yet, because of preparation factors, tea or coffee cannot simply be consumed just anywhere. Typically, tea or coffee drinkers are restricted to making the beverage at their homes or offices, buy it from restaurants, cafés or other places due to the lack of access to hot water needed for brewing. Also, tea and coffee generally require several minutes for brewing, and therefore can create complications to prepare when wanting to have one's tea or coffee to drink "on the go." For example, tea preparation may include multiple steps for heating water, brewing the tea (e.g., to control the "strength" of the tea), and transporting the tea, any of which causes the tea drinker to delay departure (e.g., while water heats) and be disordered. Coffee preparation may include similar steps with similar complications, e.g., including heating water, brewing the coffee (e.g., controlling the "strength" of the coffee while preventing grinds from entering the brewed coffee drink), and transporting the coffee at conditions suitable to drink (e.g., typically not as hot as the temperature to brew).

In order to brew an ideal cup of coffee, tea, or other beverages, the temperature of the water should be regulated at particular temperature(s) that correspond to appropriate brewing conditions for the certain type of coffee, tea, or other beverage. The temperature of the water affects the extraction of the brewing material into the beverage and therefore will taste differently based on the temperature of the brewing. It is therefore beneficial to control the setting of the water's temperature by the user, e.g., based on user-selected temperature settings associated with the specific type of tea or coffee the user will brew.

Another factor in preparing an ideal cup of coffee, tea or other beverage includes brewing the beverage for a particular amount of time, e.g., dependent on the particular type of brewing material to get a desired levels of extraction or diffusion of the compounds in the water. Without precise control of the brewing time, for example, the brewing process could lead to over brewing and the beverage may become bitter or have undesired tastes. It is therefore beneficial to control the amount of time the brewing occurs, e.g., at the particular temperature, and be definable by the user, such that the user can select brewing time settings associated with the specific type of tea or coffee the user will brew.

Another factor in preparing an ideal cup of coffee, tea or other beverage includes the movement or flow of the fluid (e.g., water) as it contacts the brewing material during the brewing stage. For example, the flow of water during brewing affects the speed at which compounds from the brewing material are extracted, and therefore, the overall composition and quality of the brewed beverage. Therefore, it is beneficial to control the flow or movement of fluid during brewing to provide greater control over extraction and allow a user to regulate the fluid flow based on the type of brewing material (e.g., type of tea, coffee, etc.) and his/her beverage preferences (e.g., "strength" of tea, coffee, etc.).

Yet another factor to prepare an ideal cup of coffee, tea or other beverage, particularly "on the go," is the temperature of the beverage post brewing. Typically, the beverage is too hot to drink right after it is done brewing, as brewing temperatures and one's drinking temperature are often different. As a result, the drinker can end up burning his/her tongue. Therefore, it is beneficial to have a notification system that warns of the temperature of the beverage. Furthermore, it is beneficial to provide a mechanism for cooling the brewed beverage to one's ideal drinking temperature.

Yet another important factor to prepare an ideal cup of coffee, tea or other beverage "on the go" is achieving the space efficiency required to offer complex functionality while preserving portability. Typically, conventional brewing devices and systems require at least two spatially separate compartments, i.e., one for storing fluid and one for storing brewing material, before the brewing process begins. Such inefficient use of space in conventional brewing devices and systems limit their utility and aesthetic design with regard to size, footprint, volume and/or weight of the brewing components and assemblies. Therefore, it is beneficial to have a brewing assembly able to store fluid and brewing materials separately and control their brewing together, within the same overall volume, creating space-efficiency while providing control of the brewing conditions (e.g., time to start, duration, etc.).

Yet another important factor to prepare an ideal cup of coffee, tea or other beverage "on the go" safely is temperature control. Typically, a drinker is unaware of the temperature of a freshly brewed beverage, and may have to test the beverage to determine if it is at a desired temperature, or even drinkable. Beyond just warning the user, it is beneficial to provide an effective user interface that displays specific information for the user to recognize when the brewed beverage is safe to drink and/or if there is a danger in drinking the beverage, e.g., caused by scalding fluids. Furthermore, it is beneficial to provide a cooling element bring a brewed beverage to a safe drinking temperature and/or desired drinking temperature.

Disclosed are methods, systems, devices, platforms, mechanisms, and media for portably brewing tea, coffee, or other beverages in a portable container that regulates the temperature and diffusion during and after brewing. The disclosed technology can control for a user's ideal parameters including brewing temperature, brewing time, and ideal drinking temperature to allow the user to have the "perfect cup" upon desire. For example, the present technology allows users to prepare and consume tea, coffee, and other hot or cold brewed beverages while on the go. Moreover, for example, the portable brewing technology disclosed herein stores fluid and brewing materials separately to control when, and under what conditions, brewing starts, but does this in a space-efficient manner. By storing the brewing material in a canister in accordance with the disclosed technology that is submerged in the fluid, but that precisely controls contact between the fluid and the brewing material, the need for two spatially-separate compartments, one for fluid and one for brewing material, in is eliminated. Furthermore, for example, the portable brewing technology disclosed herein optionally includes a cooling element, and effective user interface allowing the user to recognize danger formed by scalding fluids. In some embodiments, a portable brewing device includes safety features, such as an external display that optionally alerts the user to the current temperature or the programmed drinking temperature of the brewed beverage and a cooling unit to cool the beverage to a safe temperature.

In some aspects in accordance with the disclosed technology, a portable brewing device includes a container having a specialized canister system in the interior of the container that encloses the brewing material (e.g., tea leaves, tea bags, coffee grinds, coffee pods, etc.) and controls the movement of water, storable in the interior of the container, in/out of the canister for regulating brewing of the brewing material. The portable brewing device can further include an intelligent heating system to continuously regulate the temperature of fluid in the device and a data processing unit in communication with the canister and heating systems to control operational features and store user-specialized settings for the device.

In some aspects in accordance with the disclosed technology, a controlled brewing device includes a brewing canister assembly configured to receive and contain beverage materials like tea leaves, tea bags, coffee grinds, coffee pods, etc. and controllably allow fluid such as water to flow in or out to regulate brewing of the beverage material. The brewing canister assembly (also referred to herein as brewing canister) includes an inner canister having holes positioned along at least one region of the inner canister, and an outer canister having holes along a corresponding region to that of the inner canister. The inner canister is configured to move along and/or rotate about a longitudinal axis with respect to the outer canister. For a closed position, the inner canister can move with respect to the outer canister, or vice versa, or both can move, such that the regions with holes of each respective canister are positioned to a solid side of the other canister, thereby the brewing canister assembly closes and seals contents inside from what is outside. For an open position, the inner canister can move with respect to the outer canister, or vice versa, or both can move, such that the regions with the holes of each respective canister are positioned so that the holes are aligned (or at least partially aligned), in which the brewing canister assembly controls fluid to flow into and/or out of the inner canister. In some embodiments, for example, the brewing canister assembly is operably coupled to a control unit, such as a controller, to actuate the inner canister and/or outer canister to move between the open and the closed positions. The control unit may be configured to control an actuator (e.g., motor, etc.) to actuate the inner canister and/or outer canister to move between the open and the closed positions. The controlled brewing device can be configured as a modular device, which can be incorporated into any size vessel or brewing device for precise controlling of the brewing of tea, coffee, etc. This type of mechanism provides precise control over brewing conditions, such as time to initiate and to end brewing. The controlled brewing device also provides the most efficient use of the brewing material and space for brewing, e.g., since brewing canister assembly can store the brewing material without brewing and can move to allow brewing and stop it at will.

For example, the brewing device disclosed herein is advantageous over conventional methods for brewing tea, coffee, or the like that require the brewing material and water to be separated at first and later combined before the brewing, e.g., where one or both of the brewing material and water should be moved or brought to another chamber to contact the other for initiating brewing. The controlled brewing device does not require movement of water or the brewing material to a different chamber; rather, the controlled brewing device is able to store the water and the brewing material separately to precisely control when brewing starts, and is able to do this in a space-efficient manner to further the portability and/or decrease the size of a brewing system employing the controlled brewing device, e.g., such as a transportable "on the go" system or a moveable counter-top system.

In some aspects in accordance with the disclosed technology, a system includes an embodiment of the portable brewing device that receives communications from a device such as a smartphone, tablet, or wearable communication device having a software application ("app") with which a user interacts to send the portable brewing device instructions to brew a desired beverage, such as coffee, tea, etc. based on the user's defined parameters (e.g., brewing temperature, brewing time, and/or drinking temperature). In some implementations, the app may provide a brewing procedure based on the type of beverage to be brewed, e.g., such as a specific type of tea like chamomile tea versus black tea, or type of coffee. The brewing procedure can be displayed by the app on the user device (e.g., smartphone, tablet, etc.) as a default procedure that can be modifiable by the user with regard to certain brewing parameters. The app can maintain information about the user in an account, e.g., such as name, address, contact information, credit card or other purchasing information, etc., and information about the user's beverage consumption by the portable brewing device, which can be used for automated ordering and other functions by the app. In some embodiments, the system includes one or more computers in communication with other computers and devices in a network, such as over the Internet, referred to as the cloud to process and store data. The one or more computers are also referred to as cloud computer(s) or server(s). In such embodiments, the app operable on the user device can be in communication with the cloud server where the user's data (e.g., account) can be stored, such as the user information, beverage consumption information, and types of beverages and custom parameters he/she desires to create and store. In some implementations, the cloud server can suggest to the user to make purchases for more brewing material (e.g., coffee pods, tea pods, etc.) at/after a specific number of uses depending on the activity of the user. In some implementations, the cloud server can automate the ordering process. The user data that can be stored in the cloud and/or via the app on the user device to make suggestions for a purchase of a specific type of beverage based on the consumption of the beverages.

In some aspects in accordance with the disclosed technology, a method for controllably brewing tea, coffee or other brewable beverage includes receiving the brewing material (e.g., coffee pods, tea pods, etc.) in the brewing canister assembly with the brewing canister assembly in the closed position, e.g., to prevent any fluid from interacting with the brewing material until brewing is desired. The method includes receiving water, e.g., at any temperature such as cold or room temperature, in a chamber or container to which the closed brewing canister assembly resides, such that the water is filled to a level that the holes (presently sealed/closed) are submerged. The method includes receiving a brewing protocol at a control unit operable to actuate the brewing canister assembly and a heating unit and/or a cooling unit of the brewing device. The received brewing protocol can include instructions executable by a processor and stored in a memory of the control unit. The instructions of the brewing protocol, when executed, cause the control unit to initiate a brewing sequence including (i) heating of the water by the heating unit to a brewing temperature specified in the brewing protocol, (ii) opening of the brewing canister for a particular time specified in the brewing protocol (allowing the water to enter the interior of the brewing canister assembly and brew the beverage material), and (iii) closing of the brewing canister at expiration of the particular time, after which fluid in the container is the brewed beverage. In some implementations, the instructions of the brewing protocol cause the control unit to initiate the cooling unit to cool the brewed beverage to a drinking temperature specified in the brewing protocol. In some implementations, the control unit can be operated on the brewing device itself, e.g. such as by a capacitive button that can be pressed to signify START of brewing and to SET brewing parameters, such as brewing temperature and brewing time. In some implementations, the control unit can be operated from an external device (e.g., smartphone, smartwatch, etc.) to provide the instructions executable by the control unit to initiate and control the instructed brewing sequence.

While several of the disclosed embodiments are described primarily based on brewing tea (e.g., loose-leaf tea, tea bags, tea pods, etc. of all types) to facilitate understanding of the underlying features of the present technology, it is understood that the disclosed embodiments can also include brewing of other substances, e.g., for preparing hot or cold beverages, that include, but are not limited to coffee (e.g., loose grinds, pods, etc. of all types), leaves, concentrates, powders, or roots of other plants or fruits, such as ginger root, mint leaves, citrus peels, etc., or other substances.

FIG. 1A shows an illustrative schematic diagram of an exemplary portable brewing device 100 of the disclosed technology. The device 100 includes a container body 101 to house the components of the device 100. The container body 101 can be configured to have a variety of shapes and sizes, and to include any of various materials to provide sufficient strength, support, electrical insulation, insulation and/or dissipation of heat, and grip for a user to hold, carry, and store the device 100. The container body 101 is structured to include an opening at the top, at which a detachable/attachable (i.e., reversibly attachable) lid or cap can be secured to the container body 101. In some embodiments, for example, the container body 101 can include an add-on compartment 111 to provide storage space, e.g., for tea (e.g. loose-leaf tea or tea bags) and/or tea accessories like sugar, honey, milk or cream packets, stirrers, etc. For example, in some implementations, the container body 101 can be shaped in a cylinder-like form, e.g., as depicted in the diagram of FIG. 1A, and include a hard plastic material. The container body 101 can include an ergonomic design that includes a region for gripping.

Many size dimensions are suitable for a portable embodiment of the brewing device. By way of non-limiting examples, suitable sizes include about 3 to about 18 inches tall and about 1 to about 7 inches in width. By way of further non-limiting examples, suitable sizes include about 5 to about 15 inches tall and about 1 to about 5 inches in width. In some embodiments, a portable embodiment of the brewing device has dimensions of less than 24 inches tall and less than 10 inches wide.

Many weights are suitable for a portable embodiment of the brewing device. By way of non-limiting examples, suitable weights include about 0.05 to about 5 pounds. By way of further non-limiting examples, suitable weights include about 0.1 to about 3 pounds. In some embodiments, a portable embodiment of the brewing device has a dry weight of less than 8 pounds.

The device 100 includes an interior chamber 102 located in the container body 101, in which the top portion of the chamber 102 is open to allow fluid (e.g., water) to enter and exit the device 100 and contain the fluid in the device 100. In some embodiments, for example, the interior chamber 102 is part of the container body 101. In some embodiments, for example, the interior chamber 102 is a separate component that attaches to the container body 101, e.g., and may be detachable from the container body 101 to allow access to the components housed within the container body 101 underneath the interior chamber 102.

Many fluid capacities are suitable for a portable embodiment of the brewing device. By way of non-limiting examples, suitable fluid capacities include about 2 to about 36 ounces. By way of further non-limiting examples, suitable fluid capacities include about 3 to about 25 ounces. In some embodiments, a portable embodiment of the brewing device has a fluid capacity of less than 48 ounces.

The device 100 includes a brewing canister 103 located in the interior chamber 102. The brewing canister 103 can be positioned at various depths within the interior chamber 102, e.g., such as at the bottom of the interior chamber 102 as shown in FIG. 1A. The brewing canister 103 provides a compartment to contain the tea, brew the tea, and control the diffusion of the brewed tea liquid into the interior chamber 102. In some embodiments, for example, the brewing canister 103 can be removable from the interior chamber 102, e.g., to allow a user to load and remove tea from outside the device 100. The brewing canister 103 is structured to include an inner canister wall and an outer canister wall moveable about each other and forming an aperture at the top. The inner and outer canister walls of the brewing canister 103 each include openings, such that when the inner and outer canister walls are moved to an open position, the openings are at least partially aligned such that aligned openings span between the interior and exterior of the brewing canister 103, and when the inner and outer canister walls are moved to a closed position, the openings are unaligned such that the inner and outer canister walls prevent passageways between the interior and exterior of the brewing canister 103. The brewing canister 103 can include a cap to seal the aperture at the top, e.g., to prevent any fluid (e.g., water) from entering/exiting the top of the brewing canister 103. The inner and outer canister walls are structured to be controllably opened and closed to control the flow of water into the brewing canister 103, thereby allowing and stopping diffusion of the brewed tea into the interior chamber 102. For example, the control of the inner and outer canister walls of the brewing canister 103 can be automatically or manually actuated in order to start or stop brewing. An example embodiment of the brewing canister 103 is shown within the chamber 102 in the closed position, where the tea is not allowed to diffuse because of the structural design of the openings, which are unaligned in the closed position preventing flow of brewed tea liquid out of canister 103. Diagrams of exemplary embodiments of the brewing canister 103 are shown in subsequent figures.

The opening and closing of the brewing canister 103 allows fluid to come in contact with the beverage material (e.g., tea, coffee, etc.) for brewing the beverage material to the ideal conditions, e.g., which can be based on a user defined level of extraction. For example, to obtain the ideal beverage for the user defined level of extraction, there should be a specific flow depending on the beverage material. In some embodiments, the opening(s) in the inner canister and the outer canister are configured to be brought into and out of varying degrees of alignment by the action of an actuator acting on the inner canister, the outer canister, or both. As such, the area of the aligned opening(s) determines the degree of fluid flow into and out of the brewing canister 103 and the degree of contact between the brewing material and the fluid. In some embodiments, the brewing canister 103 has different hole sizes in order to control the amount of fluid passing through the beverage material. The hole sizes can be small such that it acts as a filter to prevent the beverage material from entering the interior chamber as to prevent continued brewing with the fluid in the interior chamber after the brewing canister is closed. In some implementations, the hole sizes can be specified based on their physical design in the inner and outer canister walls. Whereas, in some implementations, the hole sizes can be specified based on the controlled movement of the inner and outer canister walls with respect to each other, so that the degree of alignment to be in the open position can be varied to provide a range of sizes from the largest to the most minuscule size.

In some embodiments, the brewing canister 103 can also include an additional membrane that can be inserted between the inner and outer brewing canisters, e.g., to act as a filter to allow any fine brewing material to be inserted into the brewing canister 103 and prevent the material from traveling to the interior chamber 102. In such embodiments, the brewing canister can still control the extraction for brewing while also allowing brewing of any fine brewing material regardless of larger hole sizes. In some embodiments, this membrane material can be arranged inside the inner canister of the brewing canister 103 to serve the same purpose. In implementations, the beverage material is controlled from leaving the brewing canister 103 through any of the example embodiments while providing precise control of the water movement and exposure to the beverage material for controlling the brewing by controlling the fluid from the interior chamber 102. In this manner, the beverage material stays in the brewing canister 103 and is not able to interact with the fluid in the interior chamber 102 when the brewing canister 103 is in the closed position. In some embodiments, a filter or membrane can also be added in the inner canister to control confinement of the beverage material to the sealable canister to precisely control the beverage. For example, having confinement control allows the users to enjoy their brewed beverage without having to worry about over brewing from their defined ideal parameters and allows them to enjoy the brewed beverage without having to remove the material from the device before drinking. For example, such precise control of the beverage material and fluid flow allows the beverage to be brewed regardless of the time thereafter, in which the fluid would not continue to brew, which allows the beverage to be consumed at any pace without having to remove the beverage material.

The device 100 includes a heating unit 104 to cause heating of the water and regulate the temperature of the water within the interior chamber 102. The heating unit 104 can be positioned at various locations with respect to the interior chamber 102, and/or including multiple heating units 104 that can be independently controlled. The device 100 includes one or more temperature sensors 105 located at various locations along the interior chamber 102 to determine the temperature of the water, in which the measured temperature is used in regulating the temperature of the water by the heating unit 104. The one or more temperature sensors 105 can include contact and/or noncontact sensors, e.g., such as thermocouple, thermistor, resistance temperature detector, and thermostat units. In some implementations of the heating unit 104, the temperature of the fluid can be heated and/or cooled by induction heating, Peltier effect, electric heating, or other as shown in subsequent figures. For example, in an example embodiment, the heating unit 104 can include electrical resister coils that covert electrical current to heat that is provided to the interior chamber 102.

In some embodiments, also shown later in FIG. 7A, the device 100 includes a cooling unit. In implementations of the cooling unit, cooling is achieved through a spinning mechanism in which a motor (e.g., motor 113) spins a paddle (or other shaped component) in the interior chamber 102 to decrease the "time to cool" by moving the brewed fluid to cause convection for faster heat transfer from the fluid to surrounding air in the interior chamber 102. In some implementations, the spinning mechanism is positioned at the base of the vessel and is configured to spin at a high enough RPM to induce a Vortex shaped field in the brewed fluid. The resulting forced induction achieves faster cooling than otherwise would be possible in stagnant fluid. In some implementations, for example, the spinning mechanism can furthermore be combined with a Peltier for even greater cooling effects. In embodiments, the cooling unit can include a heat sink. In implementations, cooling can be achieved through the heat sink material arranged to surround the interior chamber by transferring the heat energy into the heat sink material. In some embodiments, the cooling unit can include a Peltier to achieve cooling, in which the Peltier is arranged such that the side of the Peltier touches the interior chamber 102 such that the brewed fluid can be cooled. In some implementations, the Peltier can be combined with a fan and vent assembly in a cavity of the device 100, such as a hollow region between the container body 101 and the interior chamber 102 where a vent is provided at some area on the container body 101. This example Peltier with fan and vent assembly can decrease the time for cooling by moving the heated air generated from the hot side of the Peltier out from the device to maintain a temperature gradient to allow more heat to transfer from the fluid. The Peltier also allows for both heating and cooling of the fluid to allow for brewing both in hot and cold temperatures. For example, a beverage can be brewed at a hot temperature and then cooled to become a cold beverage, or vice versa. Brewing the beverage at hot or cold temperatures have their own unique benefits; for example, brewing the beverage at hot temperatures allows for faster extraction, and brewing the beverage at cold temperatures can lead to less bitter tastes. In such implementations, for example, the example Peltier unit allows a user to choose the technique, i.e., hot brewing or cold brewing, that he/she desires depending on their preferences.

Figure 1B:
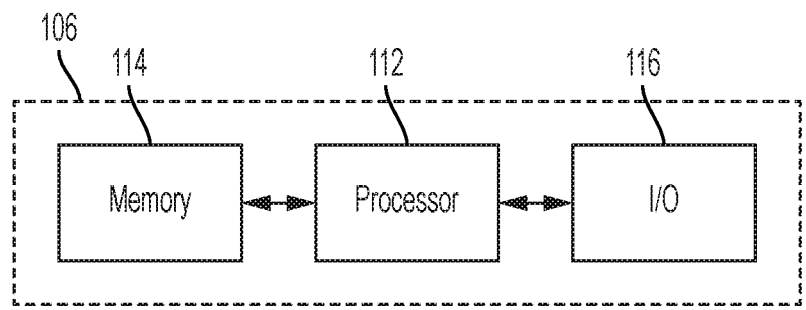
FIG. 1B shows a block diagram of an exemplary data processing unit of the exemplary portable brewing device.

The device 100 includes a data processing unit 106, also referred to as a control unit, to control features and functionality of the device 100. As shown in FIG. 1B, the data processing unit 106 can include a processor 112 to process data and a memory 114 in communication with the processor 112 to store data. For example, the processor 112 can include a central processing unit (CPU) or a microcontroller unit (MCU). For example, the memory 114 can include processor-executable code, which when executed by the processor 112, configures the data processing unit 106 to perform various operations, such as receiving information, commands, and/or data, processing information and data, and transmitting or providing information/data to another entity (e.g. external device). To support various functions of the data processing unit 106, the memory 114 can store other information and data, such as instructions, software, values, images, and other data processed or referenced by the processor 112. Various types of Random Access Memory (RAM) devices, Read Only Memory (ROM) devices, Flash Memory devices, and other suitable storage media can be used to implement storage functions of the memory 114. The memory 114 can store data and information of the data processing unit 106 and other units of the device 100, e.g., including the heating unit 104, the temperature sensor 105, and/or the brewing canister 103 (e.g. via sensors or components interfaced to the brewing canister 103), as well as information about other systems and devices in communication with the device 100. For example, the memory 114 can store device unit parameters, and hardware constraints, as well as software parameters and programs for operation on the device 100. The data processing unit 106 can include an I/O unit 116 that can allow communicative connectability of the data processing unit 106 to other units of the device 100. For example, I/O unit 116 can provide the data processing unit 106 to be in communications with other devices or systems, e.g., using various types of wired or wireless interfaces compatible with typical data communication standards, for example, including, but not limited to, Universal Serial Bus (USB), IEEE 1394 (FireWire), Bluetooth, Bluetooth Low Energy (BLE), ZigBee, ANT, IEEE 802.11 (Wi-Fi), Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, and parallel interfaces. The I/O unit 116 can also provide communicative connectability of the data processing unit 106 to an external interface, source of data storage, or display device. The I/O unit 112 of the data processing unit 106 can also interface with other external interfaces, sources of data storage, and/or visual or audio display devices, etc. to retrieve and transfer data and information that can be processed by the processor 112, stored in the memory 114, or exhibited on an output unit of the device 100. In some implementations of the data processing unit 106, for example, the data processing unit 106 can include a signal processing unit to amplify, modulate, or otherwise modify the captured electrical signals of the sensors of the device 100 or control signals to the units of the device 100. For example, the signal processing unit can include circuitry to amplify signals, and/or convert signals to and from an analog signal and a digital signal. For example, the signal processing unit can include transistors, capacitors, resistors, inductors, transistors, diodes, amplifiers, and/or other circuit elements, etc.

In some embodiments, for example, the device 100 can include other integrated electronic units, e.g., including but not limited to, a fan to provide cooling to various components of the device, other sensors to detect conditions of the fluid in the interior chamber 102, displays and/or buttons to allow a user to interact with the data processing unit 106 and view displayable information about the device 100 provided by the data processing unit 106, and/or a wired (e.g., connection) or wireless communication unit coupled to the data processing unit 106 to allow control and program the device 100 to perform certain functions by an external device, e.g., such as a computer device including a desktop or laptop computer, tablet, smartphone, or wearable computing device (e.g., smartwatch, smartglasses, etc.). For example, the sensors can include a weight sensor, optical sensor, a pH sensor, a concentration sensor, or other. For example, the wireless communications unit can include a Tx/Rx device capable of transmitting and receiving data via WiFi, Bluetooth, or near field communication protocol.

The device 100 includes a power supply 107 to supply power to the components of the device 100. For example, the power supply 107 can include replaceable batteries and/or a rechargeable battery electrically coupled to the data processing unit 106, heating unit 104 and temperature sensor 105. In some embodiments, for example, the power supply 107 can include an AC to DC converter to supply DC power to certain components of the device 100. For example, the power supply 107 can be charged by direct charging (e.g., connection to an external power source, e.g., such as an electrical outlet, a computer via USB connection, etc.), by wireless charging, and/or by solar energy conversion (e.g., using solar panels).

In some embodiments of the device 100, for example, the device 100 can include a motor 108 in communication with the data processing unit 106 and coupled to the brewing canister 103 to drive movement of the inner canister wall and/or outer canister wall to align and unalign the openings, to control the flow of water and diffusion of the tea in the interior chamber 102.

Many motors are suitable to drive movement of the brewing canister. In some embodiments, the motor is a stepper motor. Suitable stepper motors include, by way of non-limiting examples, those with at least 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 degrees per step. Suitable stepper motors include, by way of non-limiting examples, those having one of the following common step angles: 0.36°, 0.72°, 0.9°, 1.8°, 3.75°, or 7.5°. In some embodiments, the motor is a brushed or brushless AC or DC motor, or one or more AC induction motors. In some embodiments, the motor is a DC servo motor. As described herein, the motor is, in some embodiments, controlled by a control unit. In such embodiments, the motor receives a control signal from the controller to actuate the inner canister, the outer canister, or both to rotate to a desired degree in order to control the flow of fluid into and out of the brewing canister and the contact between the fluid and the brewing material.

In some implementations of the device 100, for example, the device 100 can include additional components that can be stored in the add-on compartment 111 or attached to the container 101, e.g., such as an extra battery pack, carrying handle, strap, clip, sleeve, or multipurpose lid.

The device 100 is operable to harmoniously control for the ideal brewing of a beverage based on user input. For example, this harmonious control begins with the initial state of the brewing canister 103 in the closed position containing the unbrewed beverage material, and proceeds to the controlled opening of the brewing canister 103 to regulate the flow of fluid within and expose the beverage material (according to the defined temperature and brewing time settings). For example, prior to opening, the brewing temperature is reached and the flow of the heated fluid is controlled in conjunction with the opening of the brewing canister 103 so that the movement and temperature of water causes precise extraction of the brewing material in the brewing canister 103 to form the brewed beverage in the interior chamber 102. In some implementations, the movement of the fluid is controlled through the spinning mechanism. Here, the device provides harmonious control of the closing of the brewing canister 103 once the user defined brewing settings are reached, followed by a cooling mechanism to bring the brewed fluid to the desired drinking temperature to be "ready to go." For example, cooling can be achieved by exposing the fluid to air along with stirring of the fluid for faster heat transfer and/or from another cooling mechanism such as a Peltier to the defined user drinking temperature. This allows for the "perfect" extraction of the beverage material dependent to what the user defines (e.g., customized for each beverage for each user).

In some cases, for example, the brewing process can include heating to a first temperature by the heating unit 104 (after which the brewing canister 103 is opened to begin brewing), and then heating to a second temperature by the heating unit 104, if the brewing protocol calls for multiple temperatures. Similarly, the cooling unit can bring the temperature down to a subsequent temperature (e.g., the second temperature) during the brewing process, if the brewing protocol calls for such cooler temperature during extraction.

Figure 2A:
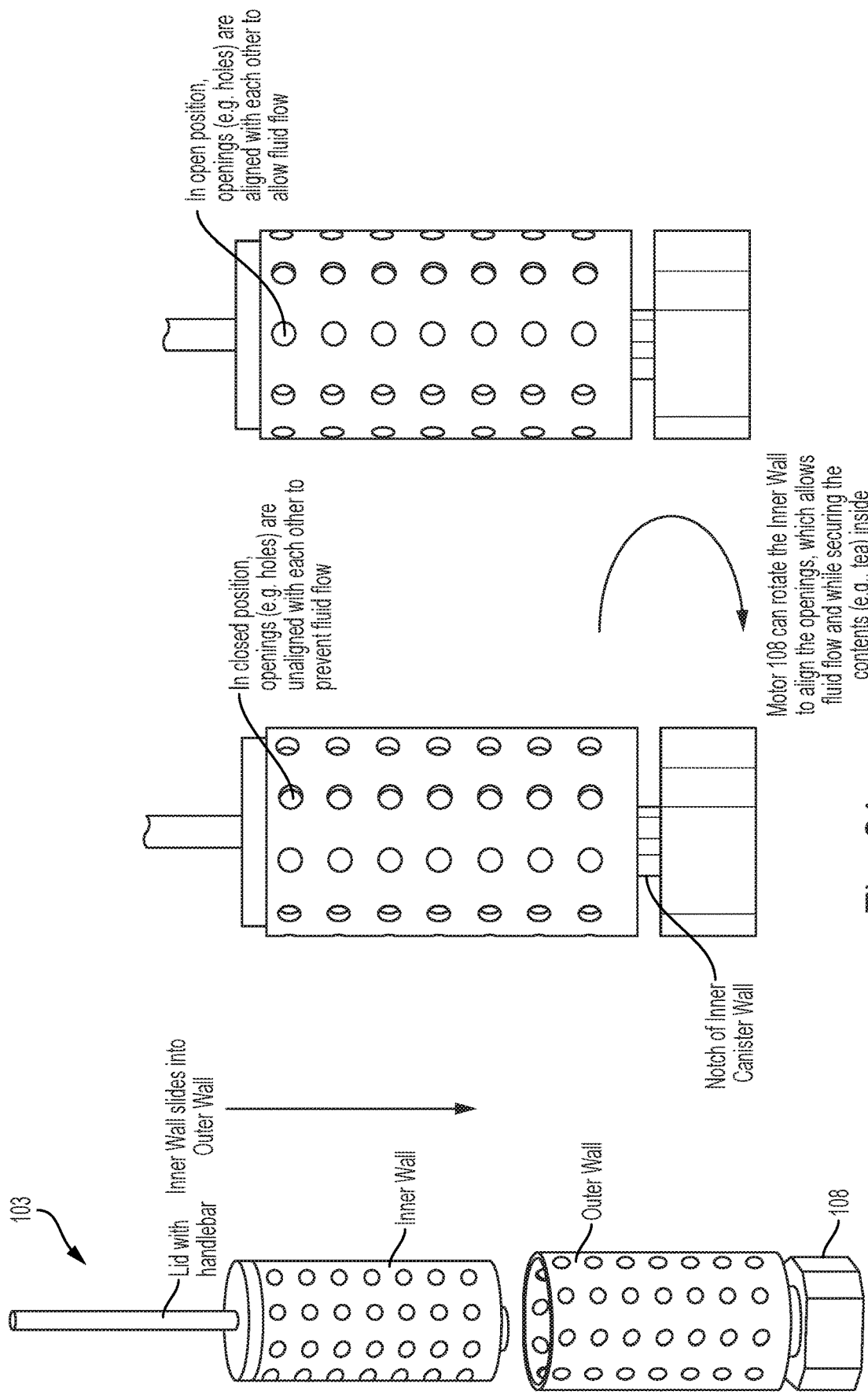
FIG. 2A shows an illustrative diagram of an exemplary brewing canister of the exemplary portable brewing device.

FIG. 2A shows an illustrative diagram of an exemplary brewing canister 103, which shows how the canister walls can be configured, e.g., including opening or closing by the motor 108. The brewing canister 103, as shown in the diagram of FIG. 2A, is structured such that the inner canister wall can fit inside the outer canister wall, e.g., which can be removed and inserted via the lid of the inner canister wall by a handlebar that can be attached and detached from the lid (e.g., screwed/unscrewed, magnet, etc.). In one example embodiment of the brewing canister 103, the bottom of the inner chamber includes a protruding notch that passes through a hole at the bottom of the outer chamber, where the bottoms of both chambers contact each other and prevent fluid and/or the contents of the canister 103 from escaping. The protruding notch of the inner canister wall is coupled with the motor 108, such that the motor 108 can rotate the inner canister wall with respect to the outer canister wall.

For example, the motor 108 can include a coupling that leads into the interior chamber 102 and couples with the protruding notch of the inner canister wall, e.g., such that the interface of the interior chamber 102 and the coupling of the motor 108 are fluidically sealed to prevent fluid from leaking out of the interior chamber 102. As shown in the diagram of FIG. 2A, when the brewing canister 103 is in the closed position, the openings (e.g., holes) are unaligned with each other to prevent fluid flow; and when the brewing canister 103 is in the open position, the openings (e.g., holes) are aligned with each other to allow fluid to flow. In some implementations, for example, the brewing canister 103 can include an interior membrane with pores that fits into the inner canister wall to allow the fluid to pass while preventing solid objects (e.g., loose tea leaves or coffee grinds) to pass through.

Figure 2B:
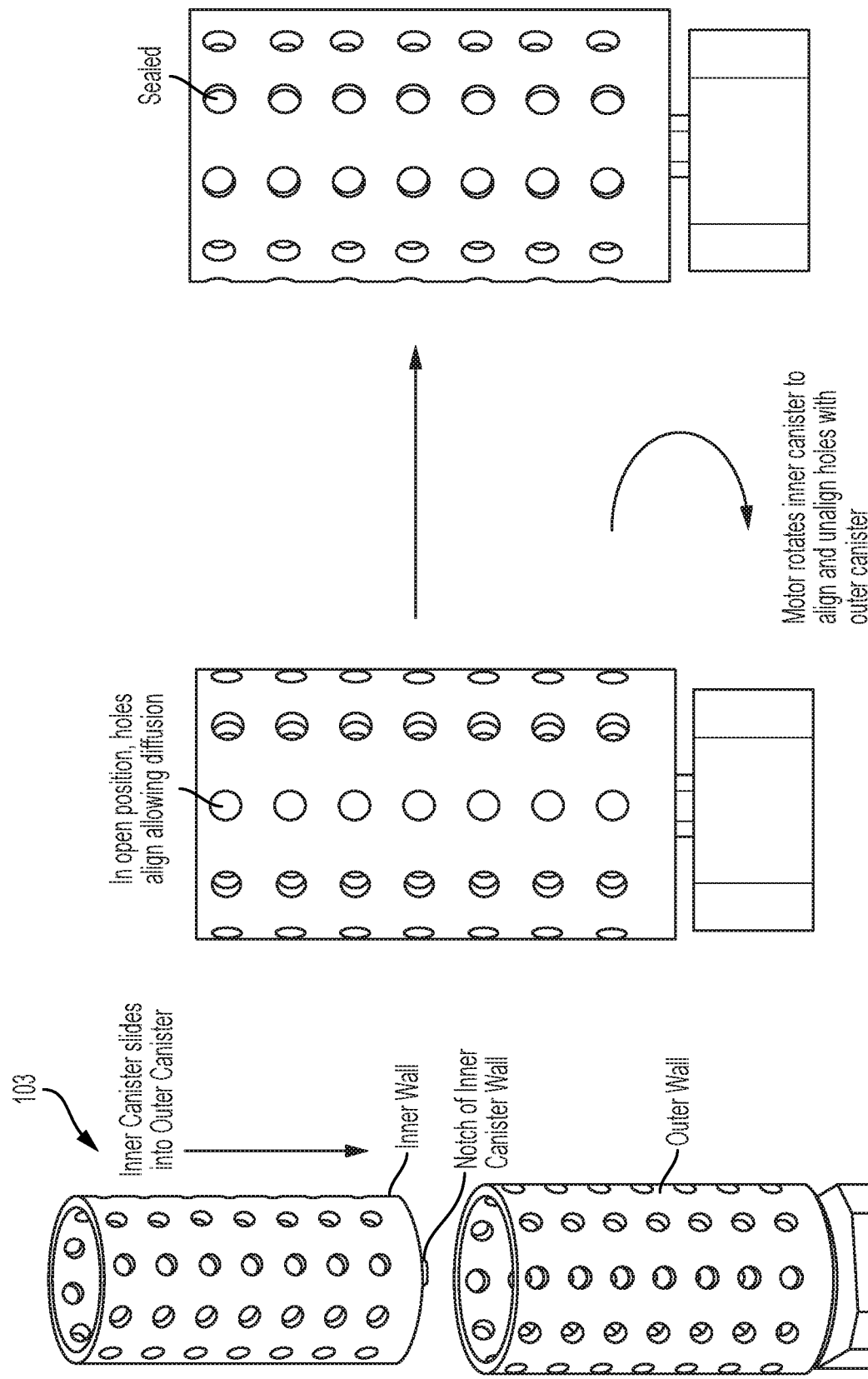
FIG. 2B shows an illustrative diagram of an exemplary brewing canister of the exemplary portable brewing device.

FIG. 2B shows an illustrative diagram of the exemplary brewing canister 103 shown in FIG. 2A, in which the lid and handle bar are detached from the inner canister wall. In some implementations of the brewing canister 103, for example, the brewing canister 103 may include a clip or inner compartment to secure a tea bag.

Figure 3:
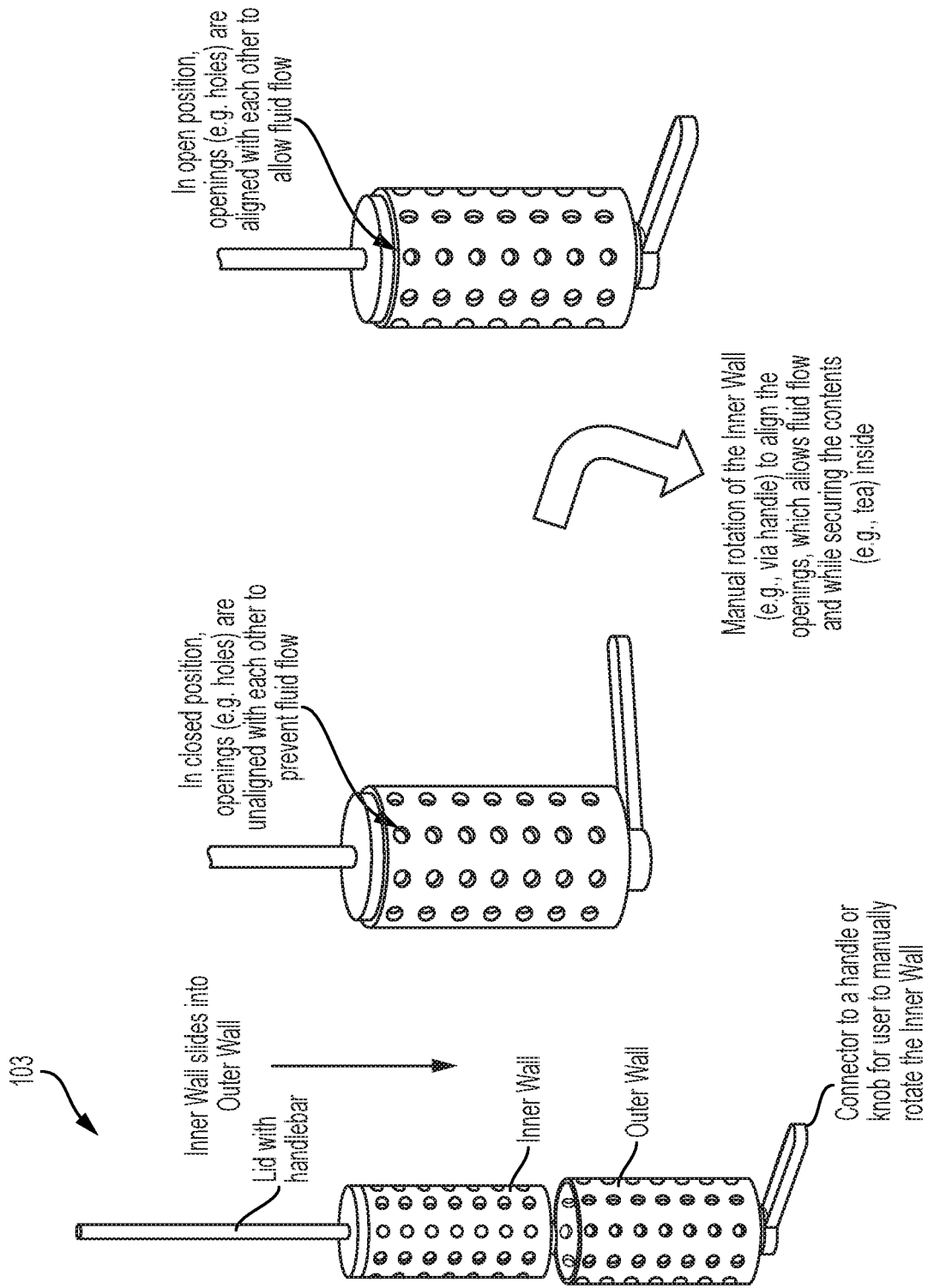
FIG. 3 shows an illustrative diagram of an exemplary brewing canister of the exemplary portable brewing device.

FIG. 3 shows an illustrative diagram of an exemplary brewing canister 103, which shows how the canister walls can be configured, e.g., including opening or closing by manually using a handle to rotate the inner canister instead of a motor.

Figure 4:
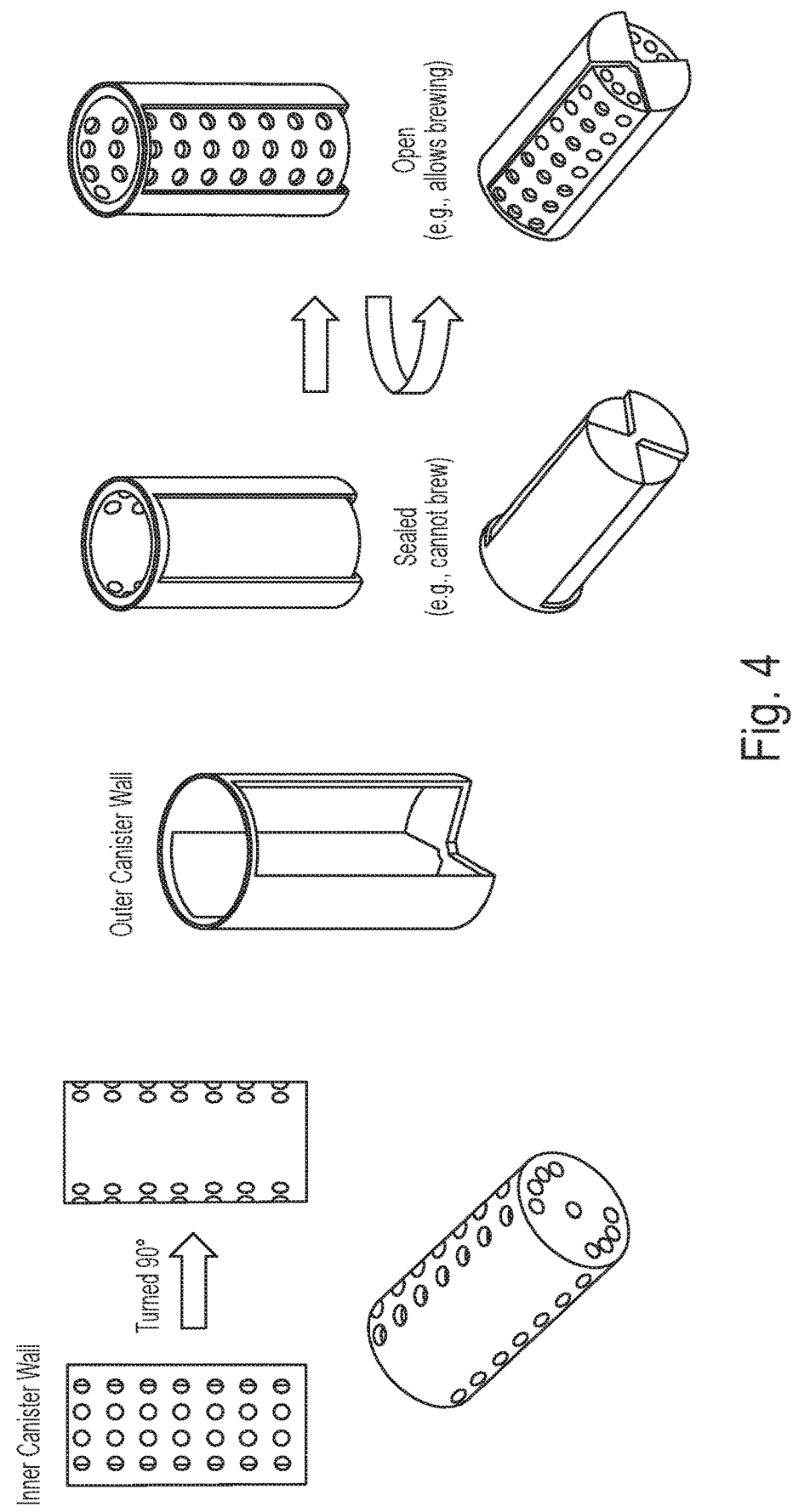
FIG. 4 shows an illustrative diagram of an exemplary brewing canister of the exemplary portable brewing device.

FIG. 4 shows another example embodiment of the brewing canister 103 where the inner canister wall is perforated with holes on two sides and is insertable into the outer canister wall that includes large openings or slots. The inner canister wall can turn, and the holes can be positioned to the solid sides of the outer canister wall, thereby allowing closing to the water. The inner canister wall can turn, and the holes can be positioned to the open slots of the outer canister wall, thereby allowing opening to the water. This exemplary brewing canister 103 can be operated to control starting and stopping of brewing, which can be performed with the attachment of a motor or manual lever to turn the inner canister wall. In some implementations, the inner canister can also have an interior membrane with small pores to allow fluid to pass while preventing solid objects to pass through instead of the two sides that are perforated with holes, e.g., thereby leaving the inner canister with two sides that are solid and the other two having large openings similar to the outer canister. In some embodiments for the brewing canister 103, the inner canister can be removable so that it may be substituted for a disposable canister that will allow for a single serving of tea, coffee, etc.

Figure 5A:
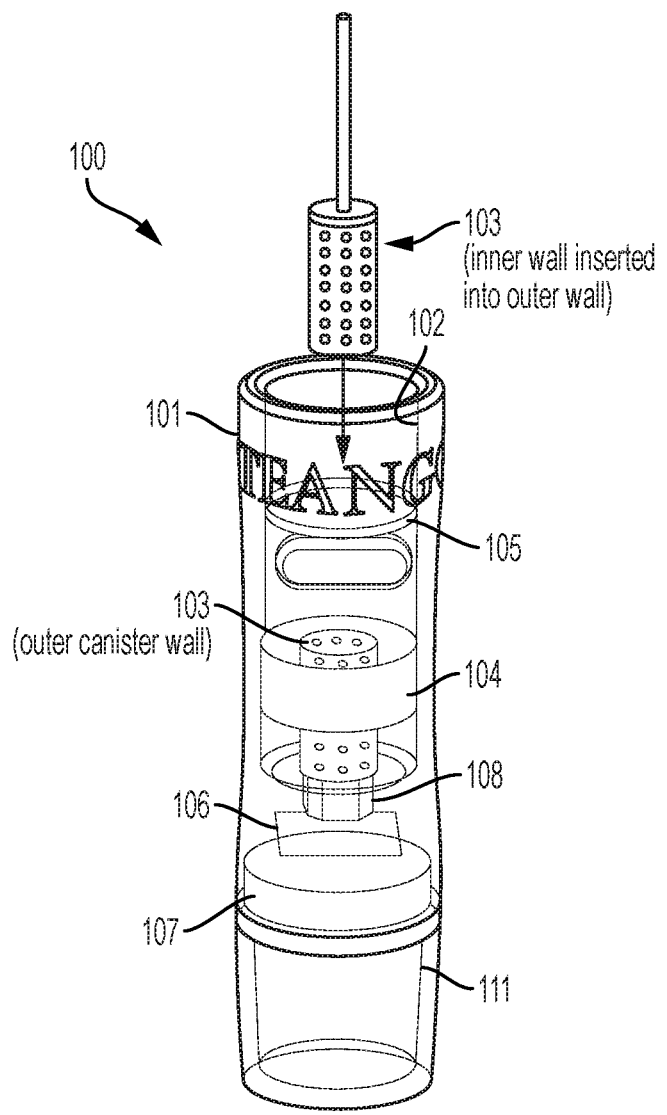
FIGS. 5A and 5B show illustrative diagrams of exemplary portable brewing devices in accordance with the disclosed technology.
Figure 5B:
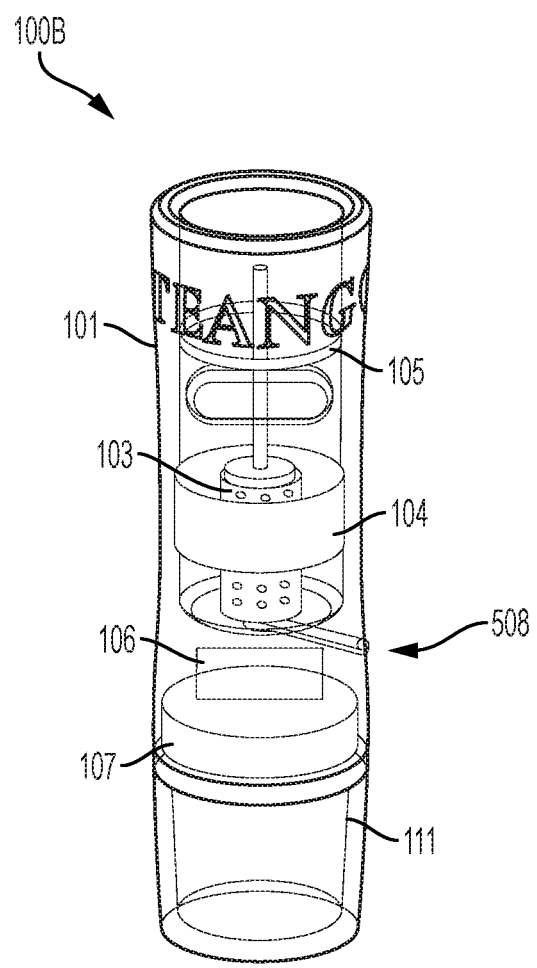

FIGS. 5A and 5B show illustrative diagrams of exemplary portable brewing devices of the disclosed technology. FIG. 5A shows the exemplary device 100 where the inner canister wall of the brewing canister 103 is being inserted into the interior chamber 102 and inside the outer canister wall of the brewing canister 103. FIG. 5B shows an exemplary portable brewing device 100B that includes a manual lever 508 that is coupled to the brewing canister 103 to allow the user to manually align and unalign the openings of the inner and outer canister walls to permit and prevent diffusion. The manual lever 508 can be coupled to a knob or button on the exterior of the container body 101 so that the user can actuate the lever 508 to control the movement of the inner canister wall of the brewing canister 103.

In some embodiments of the portable brewing devices of the present technology, the heating unit 104 can be located below the interior chamber 102, or at various positions along the cylindrical interior chamber 102. In some embodiments of the portable brewing devices of the present technology, the brewing canister 103 can be attached to the reversibly attachable lid of the device, such that the manual lever 508 is also coupled to the inner canister wall and a button or knob on the exterior of the lid to allow the user to manually control the opening and closing of the brewing canister 103. In some embodiments of the portable brewing devices of the present technology, the brewing canister 103 can be suspended at a position in between the bottom and the top (e.g. under the lid) in the interior chamber 102, e.g., in which the outer canister wall is coupled to connecter arms that span from the wall of the interior chamber 102.

Figure 6:
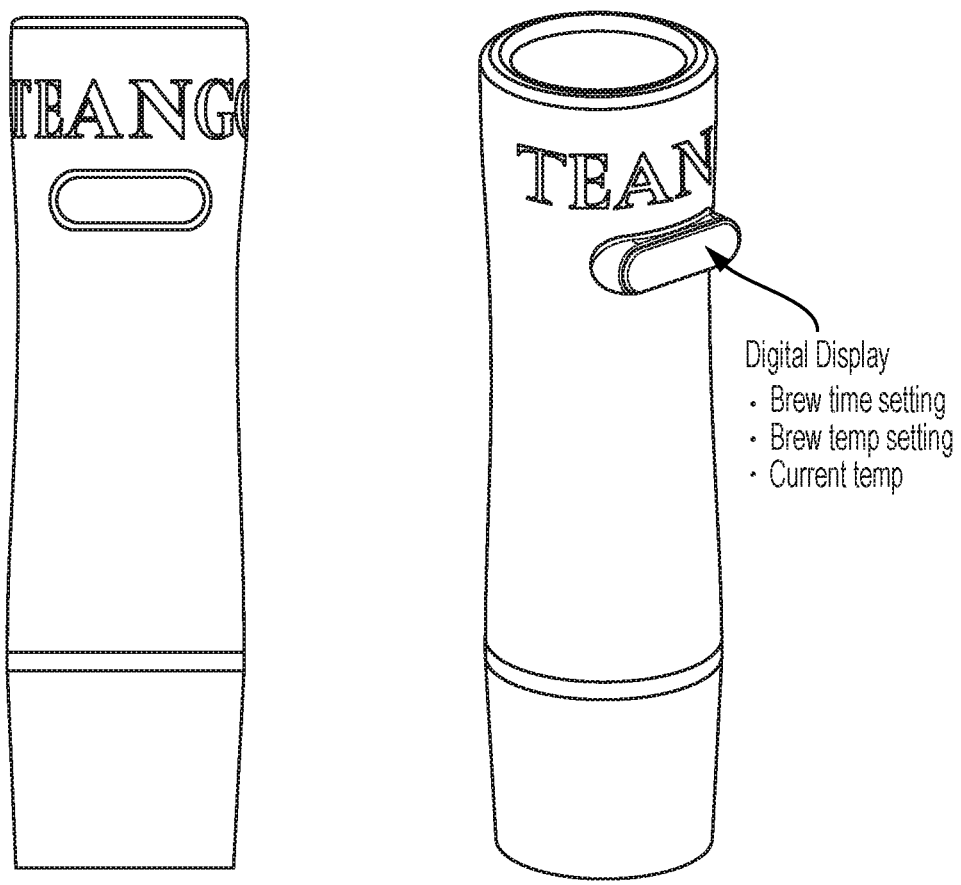
FIG. 6 shows a diagram of an exemplary embodiment of an exemplary portable brewing device including a display and control panel for a user to control the operation of the device.

The disclosed portable brewing technology allows users to add and store water and brewing substances separately, and initiate brewing of the tea, coffee, or other substances anywhere. For example, to brew the tea, a user can simply activate a brewing sequence to initiate heating, brewing the beverage, and cooling e.g., by push of a button. In some implementations, the user can also activate a sequence to cool of the beverage. FIG. 6 shows a diagram of an exemplary embodiment of the portable brewing device including a display and control panel for a user to control the operation of the device. For example, the display can include a display screen that features controls, and/or buttons, to display and control brew time settings, brew temperature settings, and/or the current temperature.

Many display technologies are suitable for an external display screen. Suitable technologies include, by way of non-limiting examples, liquid crystal displays (LCD), thin film transistor liquid crystal displays (TFT-LCD), organic light emitting diode (OLED) displays (including passive-matrix OLED (PMOLED) and active-matrix OLED (AMOLED) displays, as well as plasma displays. Many types of information are suitable for display on an external display screen. Suitable information includes, by way of non-limiting examples, user information, current brewing information (protocol, material, start time, stage of brewing, current brewing conditions, etc.), stored brewing information, safety information, and the like. For example, in various embodiments, an external display is configured to display the temperature of the fluid, the stage of the brewing process, the time remaining in the brewing process, the elapsed time of the brewing process, or a combination thereof. In some embodiments, the information is mirrored to a display screen of a user's mobile or desktop computing device, vehicle in-dash or heads-up display (HUD), and/or head-mounted display (HMD), such as a virtual reality (VR) headset.

Figure 7A:
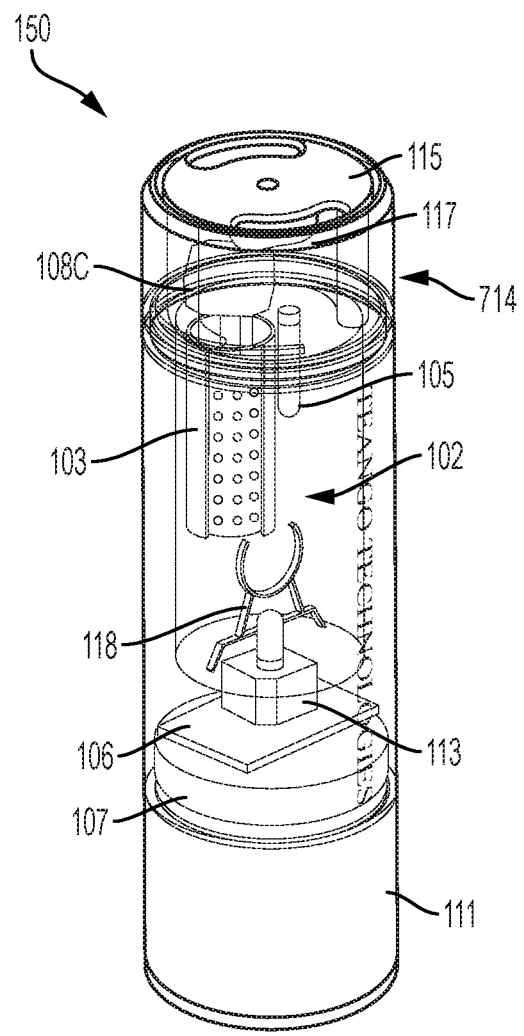
FIG. 7A shows an illustrative schematic diagram of an exemplary portable brewing device in accordance with the disclosed technology.

FIG. 7A show an example embodiment of a portable brewing device 150 of the present technology. The device 150 is structured to include at least some of the components as in the device 100, with additional and/or different components or configurations as described. The device 150 includes a lid 714 attachable to the container body 101 of the device 150. For example, in some embodiments the lid 714 includes a threaded region at the lower interior portion of the lid 714, such that threads may engage corresponding threads of a threaded region at an upper exterior portion of the container body 101. In other embodiments, the lid 714 may securably engage the container body 101 using another mechanism, e.g., such as a hinge with a locking/unlocking component, or other. The device 150 is configured such that the brewing canister 103 engages with a motor 108C that is attached to the lid 714 of the device 150. The motor 108C is configured to have the same function as the motor 108 of the device 100 shown in FIG. 1A, but is housed within the lid 714 of the device 150.

In one example embodiment of the brewing canister 103 as configured in the device 150 shown in FIG. 7A, a portion of the inner chamber includes a protruding notch that passes through a hole at a corresponding portion of the outer chamber, where these portions of both chambers contact each other and prevent fluid and/or the contents of the canister 103 from escaping. The protruding notch of the inner canister wall is coupled with the motor 108C, such that the motor 108C causes the inner canister wall to rotate with respect to the outer canister wall. In some embodiments, the motor 108C can include a coupling that leads into the interior chamber 102 and couples with the protruding notch of the inner canister wall, e.g., in which the interface of the interior chamber 102 and the coupling of the motor 108 are fluidically sealed to prevent fluid from leaking out of the interior chamber 102.

This embodiment of the portable brewing device of the present technology also includes a cooling mechanism to cool the fluid in the inner chamber 102 with a spinning component 118 that can spin, as actuated by a motor 113 via control by the data processing unit 106. In some embodiments, the spinning component 118 is actuated by manual control. The example embodiment of the spinning component 118 shown in FIG. 7A is one of several possible embodiments that is shaped in order to cause the surrounding fluid to move in order to stir and mix the beverage and/or to aid in cooling the beverage. The spinning component 118 can spin fast enough to cause a mass of spinning liquid and air (e.g., derived from the top of the interior chamber 102 when settled) that pulls the liquid into the center and having an angular velocity such that the air fills the space directly above the spinning component with spinning liquid surrounding. In some implementations, the spinning pattern of the fluid resembles a whirlpool or vortex. For example, by creating the vortex, a convection of air and water is created, which can increase the amount of surface area of liquid that is exposed to the air. This forced convection will increase the amount of heat transferred from the liquid to the air and thereby cool the beverage. Another way to cool the fluid is by having a phase changing cooling system that can have a material in between the inner shell and outer shell such that the material can absorb and maintain the extra heat due to an affinity for the extra heat. Although not shown in the diagram of FIG. 7A, the device 150 optionally includes the heating unit 104. In such embodiments including the heating unit 104, the heating unit 104 is optionally located below the interior chamber 102, or at various positions along the cylindrical interior chamber 102. In such embodiments of the device 150 including the heating unit 104 or embodiments of the device 100, the heating unit 104 is optionally configured as dual or alternating heating and cooling unit, e.g., such as a Peltier device.

In some embodiments of the lid 714, the lid 714 includes a cap assembly 115 that can be automatically controlled by a motor 117 or manually controlled to rotate in order to align or unalign with the hole or holes in the lid 714. For example, the lid 714 can include a drinking hole that can be covered and uncovered by the cap assembly 115 based on rotation of cap assembly 115 via the motor 117 or manual rotation by the user. In some implementations, the lid 714 can include an additional hole or holes, e.g., for venting.

FIG. 7B shows one embodiment that shows a top view of the lid 714 and cap assembly 115. The cap assembly 115 includes a lid cap 115A having two holes 115B that can be aligned with holes in a lid base 115C to allow air to get in and out of the interior region of the container body 101 of the device 150 to aid in the cooling process of the spinning component 118. For example, the data processing unit 106 can harmoniously control the spinning component 118 via the motor 113 and the cap assembly 115 via the motor 117 to synchronize the fluid flow with the air venting to precisely control cooling to desired temperatures. In some implementations, the holes can be aligned in order to allow the brewed fluid to flow out for drinking the beverage. The cap assembly 115 can also be in the closed position as illustrated in FIG. 7B to prevent air and water from entering or exiting.

Figure 8:
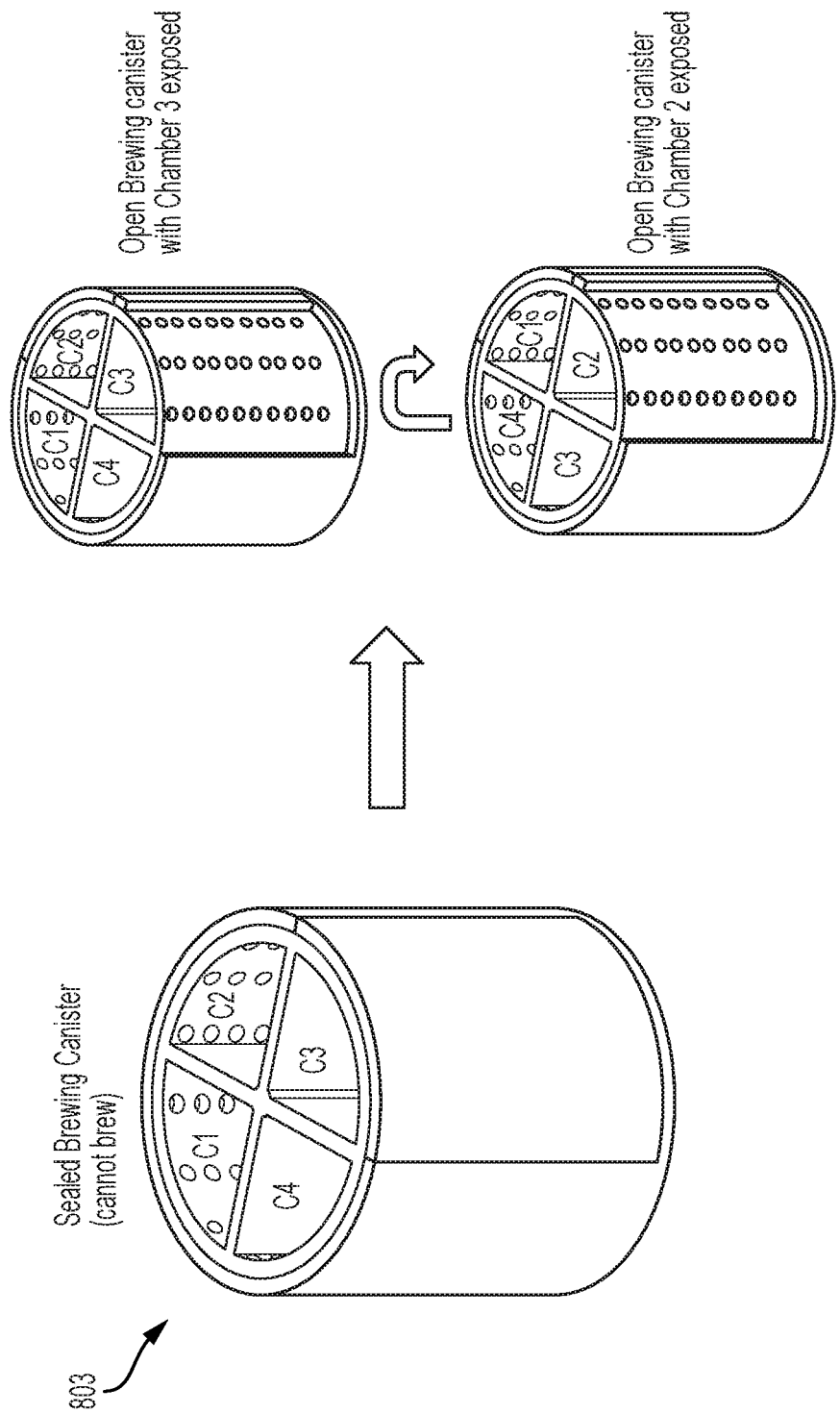
FIG. 8 shows an illustrative diagram of an exemplary brewing canister of the exemplary portable brewing device including a multi serving mechanism.

FIG. 8 shows an example embodiment of the brewing canister 803 where the inner canister has multiple compartments (e.g., two or more) to allow multiple servings to be brewed without requiring a user to clean out the canister and reload with new tea, coffee, etc. This canister embodiment, similar to the other embodiments of the brewing canister, can be attached to the lid 714 or anywhere in the inner chamber 102. As shown in the example of FIG. 8, the outer canister of the brewing canister 803 has an opening on one side, which allows exposure of one serving to the fluid and remains fixed in position while the inner canister rotates about its center axis thereby positioning the desired chamber in the exposed position. A door slides along the outer canister and seals the exposed chamber thereby inhibiting fluid from entering the chamber. This allows controlled brewing of each specific chamber one at a time. This is illustrated in FIG. 8 where the inner canister can be rotated to expose the different chambers in the open position (e.g., C1, C2, C3, C4). Other embodiments of the brewing canister are contemplated to achieve a separated multi-chambered brewing canister.

Many configurations are suitable for an inner canister with multiple compartments. For example, in various non-limiting embodiments, the inner canister comprises 2, 3, 4, 5, 6, 7, 8, or more compartments. Such multi-compartment configurations are useful for a variety of applications, including, for example, wherein a user desires to brew multiple servings of a beverage without having to empty or clean the brewing canister in-between, wherein the user desires to brew more than one distinct beverage, and wherein the user desires to brew a beverage under more than one brewing protocol. These scenarios allow the user to accommodate the preferences of multiple individuals or the preferences of one individual over the course of time, such as over the course of a day. In some embodiments the size, number, configuration, and geometry of the openings (in some cases holes or perforations) vary in the different compartments of a multi-compartment brewing canister to, for example, accommodate different brewing materials.

Figure 9A:
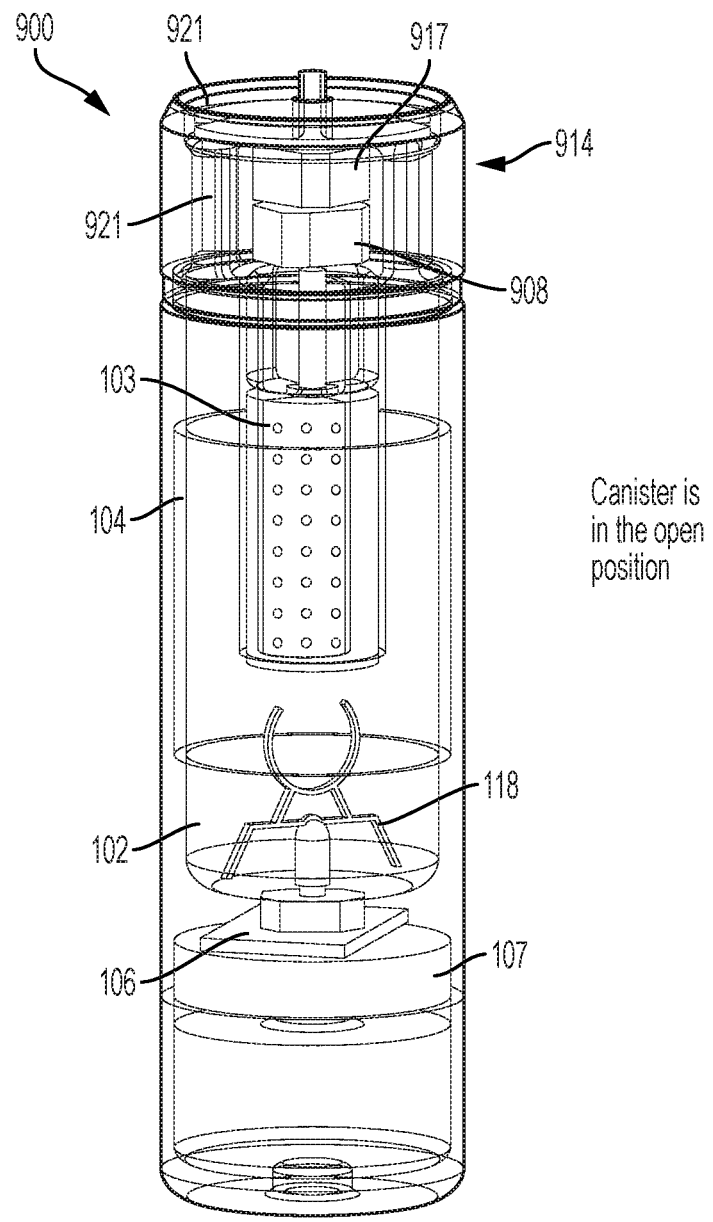
FIGS. 9A and 9B show an illustrative schematic diagram of an exemplary portable brewing device in accordance with the disclosed technology.
Figure 9B:
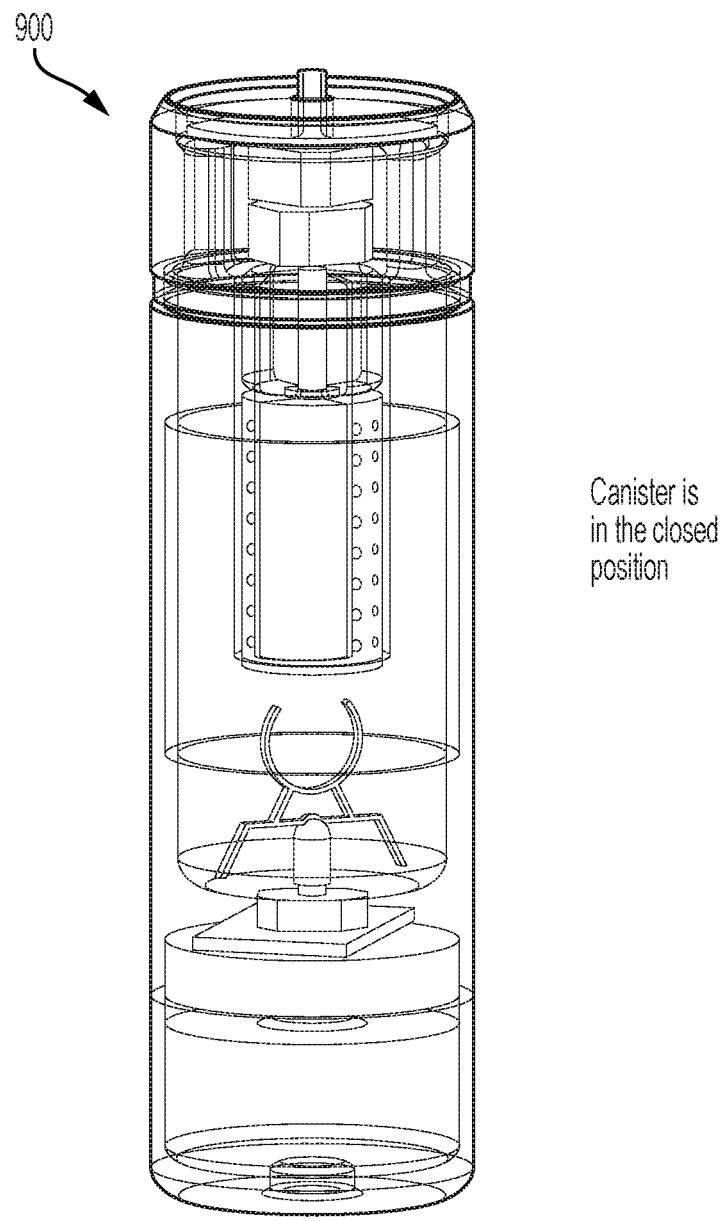

FIG. 9A shows an example embodiment of the portable brewing device 150 configured to be automatic, labeled portable brewing device 900. The device 900 includes at least some of the components as the example embodiment of the device 150 shown in FIG. 7A, with additional and/or different components or configurations as described. In this example, the device 900 includes the brewing canister 103 attached to a lid 914, which is controlled by a motor 908 (e.g., lower motor) housed in the lid 914. The brewing canister 103 is attached to the lid 914 by a rotatable assembly operably coupled to the motor 908, e.g., shown in the diagram as a shaft connected to the motor 908 and the top of the inner canister of the brewing canister assembly 103. The device 900 includes a motor 917 (e.g., upper motor) that controls the alignment of the drinking and/or venting holes 921 in the lid 914. The device 900 includes the spinning mechanism 118, in this example arranged at a bottom region of the interior chamber 102, in which the spinning mechanism 118 includes a paddle operably coupled to a motor to spin the paddle. The device 900 includes the heating unit 104 including a heater that is wrapped around the outside of the interior chamber 102. In some examples, the heating unit 104 is located below the interior chamber 102, or at various positions along the cylindrical interior chamber 102. The heating unit 104 can be configured as dual or alternating heating and cooling unit, e.g., such as a Peltier device. The device 900 includes the data processing unit 106 and power supply 107. The diagram of the device 900 shown in FIG. 9A depicts the brewing canister 103 in the sealed (closed) position, e.g., preventing any water from flowing in/out of the brewing canister 103. FIG. 9B shows a diagram of the device 900 depicting the brewing canister 103 in the open position allowing water to flow into the canister.

Figure 10A:
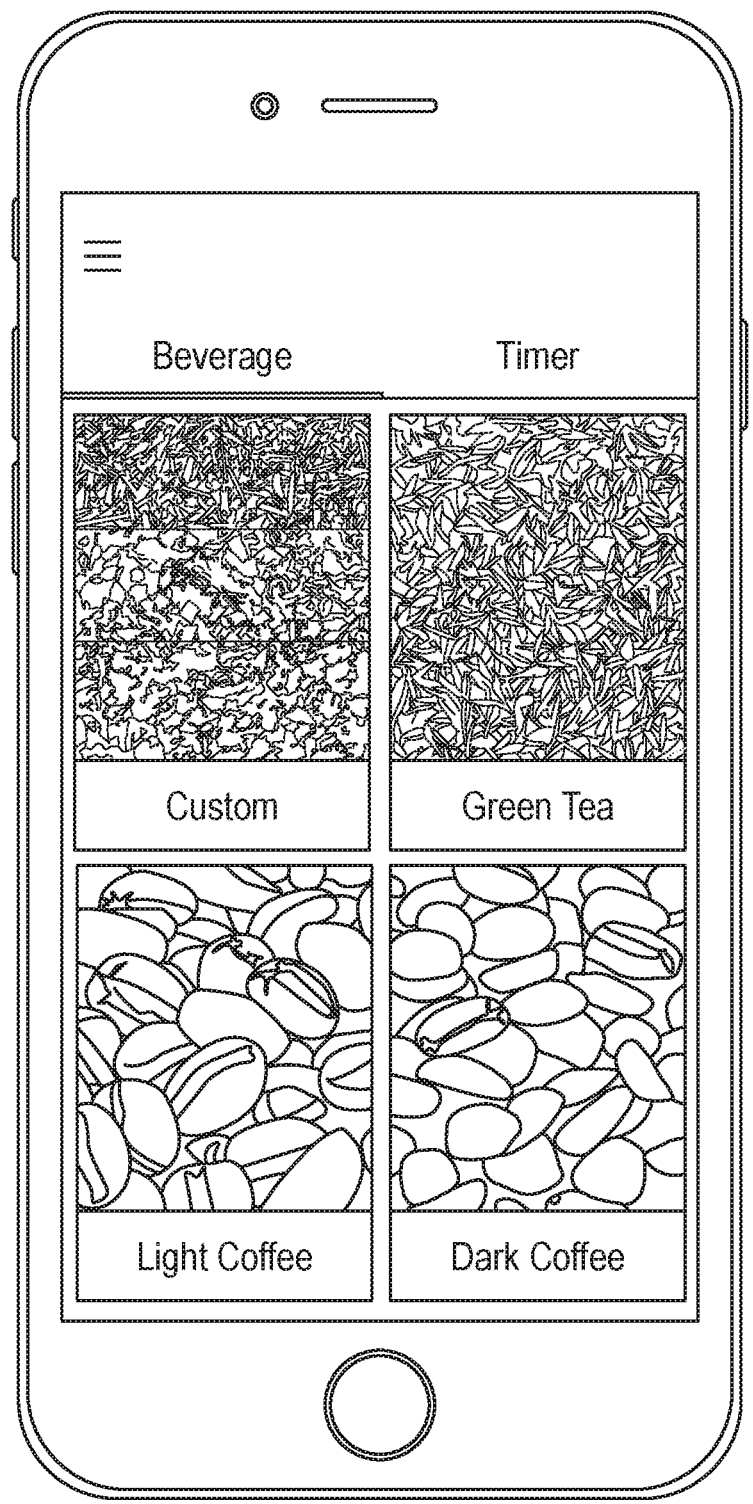
FIGS. 10A-10C show illustrations of a user interface display of a software application (app) in accordance of the disclosed technology.
Figure 10B:
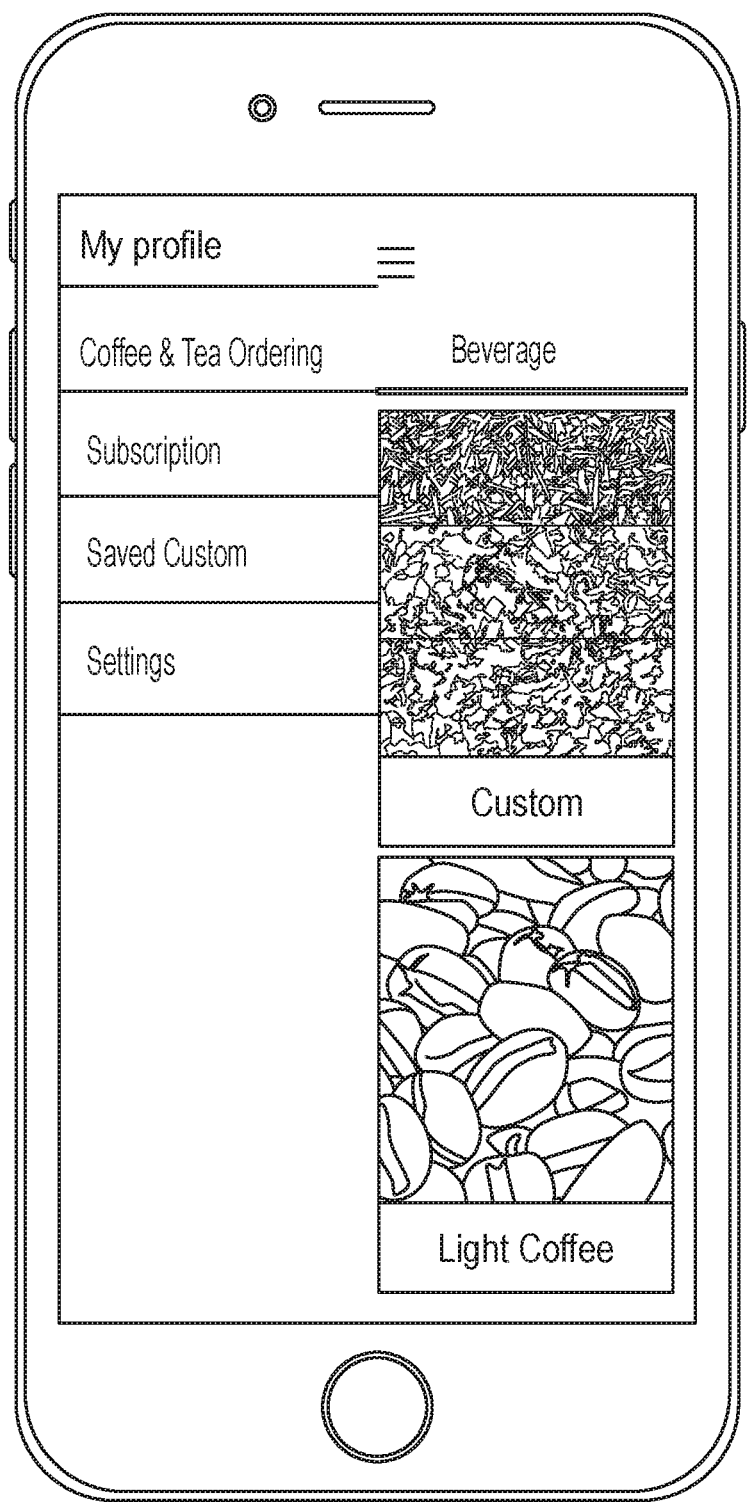
Figure 10C:

FIGS. 10A-10C show illustrations of a user interface display of a software application (app) in accordance of the disclosed technology presented on a user's computing device (e.g., a smartphone). The app can be used to receive the user's input, e.g., such as brewing parameters, and send instructions to the brewing device, e.g., such as the various embodiments of the device 100, the device 150, the device 900, or any other embodiments of a brewing device in accordance with the disclosed technology. FIG. 10A shows an illustration of a user interface display screen presented by the app that enables the user to easily select the type of tea, coffee or other beverage the user desires to be brewed by the brewing device. The app receives the user selection and processes this data to determine the brewing instructions to be implemented by the brewing device, and automatically sends the brewing instructions to the device. Using the app, the user is able to create saved settings for their favorite common and/or custom beverages, which can be presented by the app as a "shortcut" to such custom settings, as depicted by the examples "Green Tea," "Light Coffee," "Dark Coffee" and "Custom" as shown in FIG. 10A. In some implementations, the user can quickly choose their custom settings by selecting the associated picture on the user interface display, as shown in FIG. 10A, in which the app will transition to the user interface shown in FIG. 10C.

FIG. 10B shows an illustration of the app's user interface depicting the menu display, represented in this example by the app as three parallel lines. For example, the user can press the menu button (e.g., three parallel lines) to access their profile, ordering, subscription, saved custom brewing settings, or general settings. For example, the user can select the menu button to change their preferred profile settings which would result in the display screen transitioning from FIG. 10A to FIG. 10B. Profile settings can include the desired drinking temperature for each type of beverage, as well as the user defined or default defined settings for each of the types of beverages. For example, in the user's profile, the user could select the brewing temperature at 175 degrees Fahrenheit instead of a default temperature (e.g., such as 180 degrees Fahrenheit) for green tea. Similarly, for example, in the user's profile, the user modify the brewing time as well. In this example, the change in the brewing temperature to 175 degrees Fahrenheit in the user's profile will change the green tea brewing accessible by the green tea shortcut shown in FIG. 10A.

From the app, the user can manage their beverage subscription or order the beverage material (e.g., coffee, tea, etc.) online, e.g., in which the app operable on the user's device is in communication with a cloud server in communication with vendor systems to purchase the desired beverage material. In implementations where the app on the user device is in communication with the cloud server, since the app sends information to the cloud such as the type/quantity of beverage material to order, a record can be stored on the cloud server (and/or the app) of the beverages used and/or ordered, e.g., to understand when a user will be running out of the beverage and automatically order more of the beverage material prior to running out. This example feature can be managed as a subscription or one time order placement, e.g., set on the app.

Figure 11A:
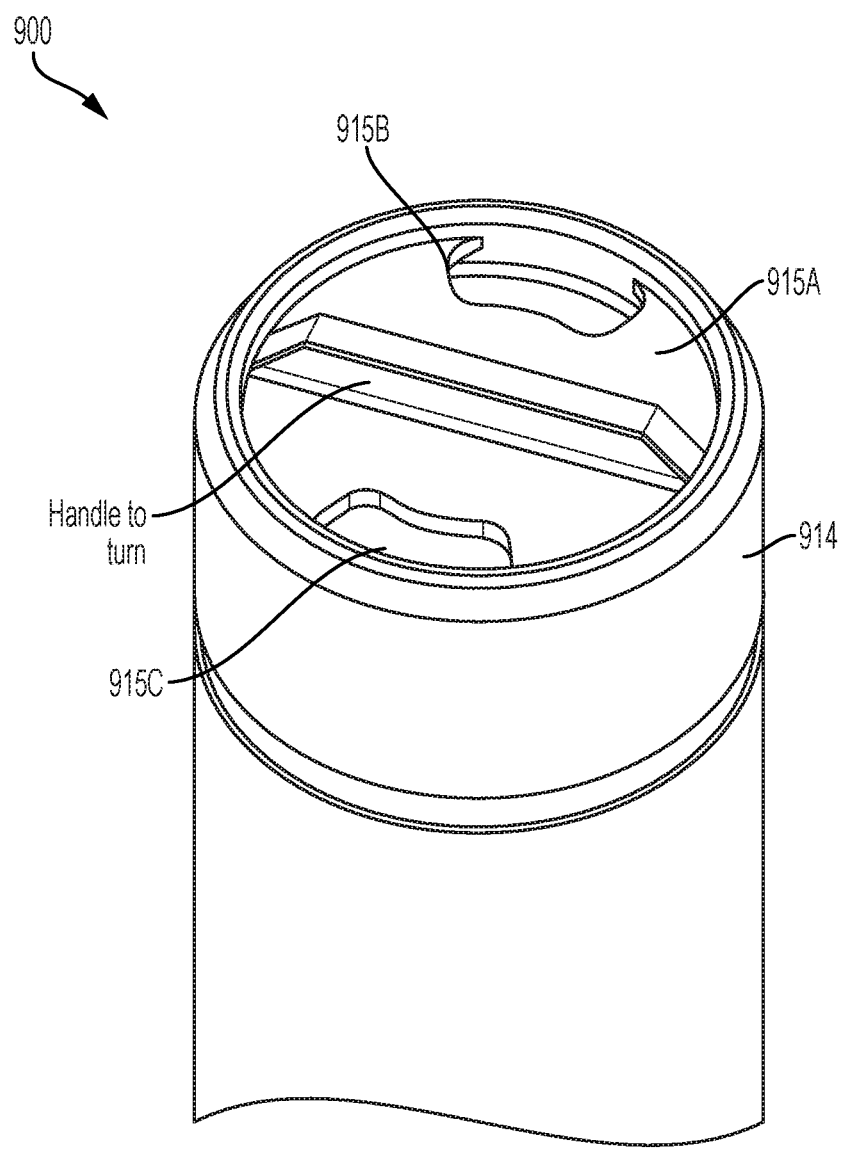
FIGS. 11A and 11B show an illustrative schematic diagram of an example embodiment of a specialized lid of the portable brewing devices in accordance with the disclosed technology.
Figure 11B:
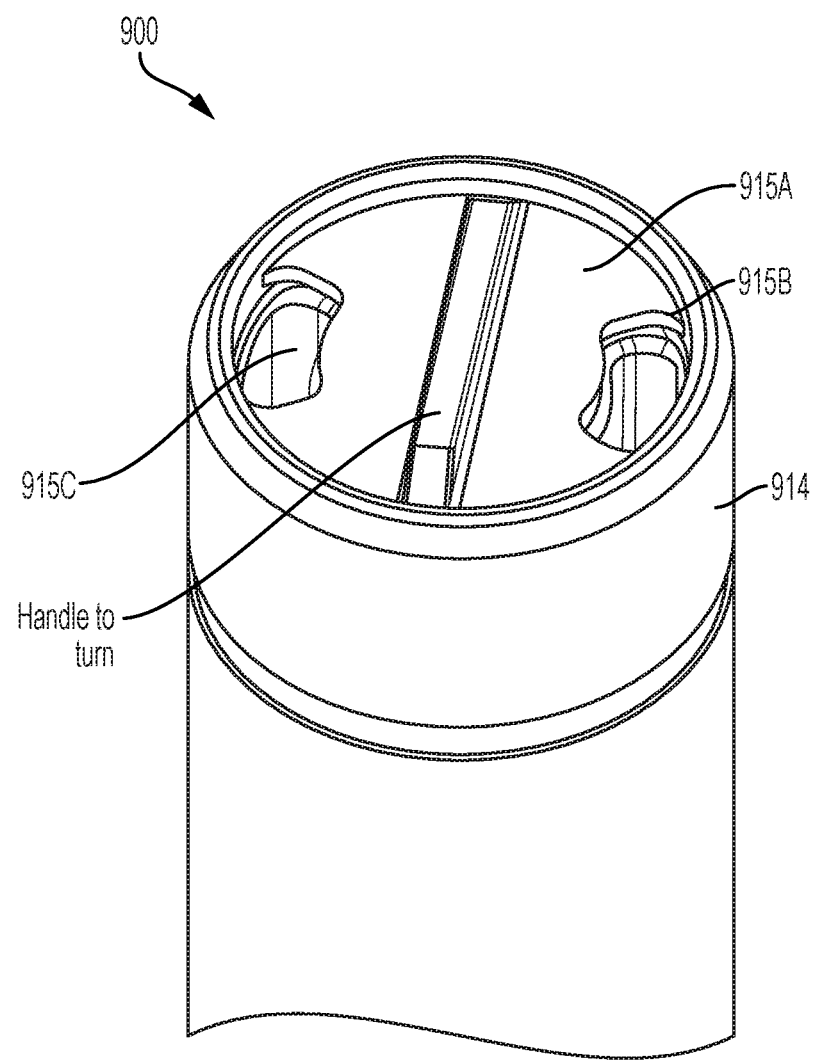

FIGS. 11A and 11B show an example embodiment of the lid 914 of the device 900. FIG. 11A shows an embodiment of the lid 914 that includes a lid cap 915A having one or more holes 915B that align and unalign with openings in a lid base 915C arranged underneath the lid cap 915A. For example, when the hole(s) 915B of the lid cap 915A are turned to a position in which no hole(s) are aligned with respect to openings of the underlying lid base 915C, the lid 914 therefore prevents any fluid from leaving the device from the mouth pieces or dispenser. The example of the lid 914 shown in FIGS. 11A and 11B include a grip or handle component to which a user can manually turn the lid cap 915A in accordance with certain embodiments.

FIG. 11B shows an embodiment of the lid 914 in which the one or more holes 915B of the lid cap 915A are turned to a position in line with the openings of the underlying lid base 915C, therefore allowing the fluid (e.g., brewed beverage) to dispense through the lid 914, e.g., from the inner chamber 102 of the device 900.

FIGS. 12A-12D show an example embodiment of a lid 1214 that can store substances like sugar and milk and is attachable to various embodiments of the portable brewing device in accordance with the present technology. The lid 1214 includes two reservoirs on the sides that can hold substances that a user could add into the beverage, e.g., such as milk and sugar. In some embodiments, the lid 1214 can be configured to dispense the substances into the beverage automatically, e.g., via a motor, by control from the data processing unit 106. Whereas, in some embodiments, the lid 1214 can be configured to dispense the substances into the beverage manually, e.g., by manual control from the user, e.g., via a grip or handle such as the grip or handle component shown in FIGS. 11A and 11B.

FIG. 12A shows the lid 1214 including a cap assembly with one or more holes 1205 aligned to a solid part of an underlying lid portion such that the lid 1214 is closed so no fluid can dispense through the lid 1214. The cap assembly can be turned clockwise to a position shown in FIG. 12B such that the one or more holes 1205 in the cap assembly becomes aligned with opening to interior reservoir(s) in the lid 1214. The reservoirs are provided, for example, to store substances such as milk and sugar that the user of the portable brewing device can add to the brewed beverage when desired, e.g., directly from the reservoir(s). The cap assembly shown in FIG. 12B can be turned clockwise to another position shown in FIG. 12C, such that the one or more holes 1205 in the cap assembly become aligned with the drinking and/or venting holes in the underlying lid portion, e.g., which can act as a mouth piece or dispenser for the fluid to pass through the lid 1214.

Figure 12D:
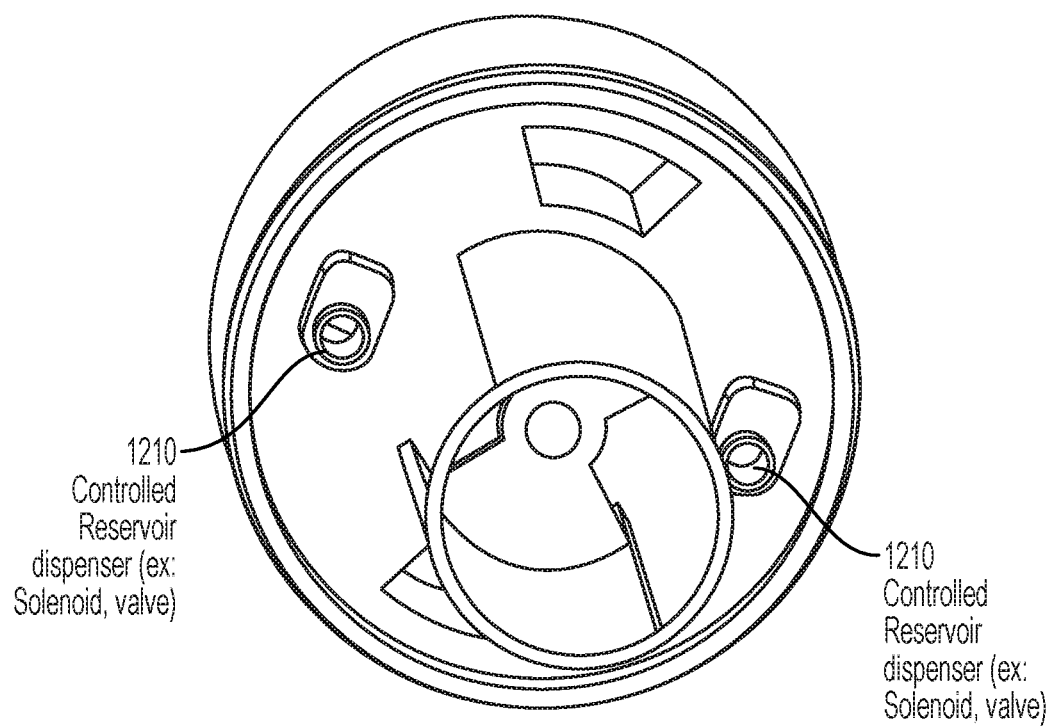

FIG. 12D shows a controlled dispenser 1210 for the reservoir (e.g., solenoid, valve, etc.) which is located at the bottom of the reservoir such that it can control the release of the substance held in the reservoir, e.g., into the fluid contained in the interior chamber 102 of the device 900 when the lid 1214 is attached. The controlled dispenser 1210 can be configured to be in communication with the data processing unit 106 of the portable brewing device to operate the dispensing of the substance(s) as part of the brewing protocol. For example, this can allow for automatic dispensing of a precise amount of milk and sugar to mix with the beverage, which can be controlled through the user's device, via the app, and programmed by the user as a setting using the app.

FIG. 13A shows an example illustration of the app operating on the user's smartphone sending brewing instructions to the portable brewing device 900 to control the brewing protocol. In this example, the app receives input from the user selecting a portion of the displayed user interface that corresponds to the user's preferred settings for the beverage (and/or through setting a timer that will automatically send the instructions to device 900). This functionality allows the user to put the beverage material (e.g., tea, coffee, etc.) into the brewing canister 103 of the device 900 while in the closed position and add the fluid (e.g., water) in the interior chamber 102 of the device 900 such that the fluid will not interact with the beverage material until the brewing procedure is desired to begin. This allows the user to wait to initiate the brewing at a desired time before the device 900 will start the brewing process. This allows a fresh beverage to be made on a timer despite the brewing canister 103 being submerged in the fluid contained in the interior chamber 102, as the beverage material is sealed in the brewing canister 103 from the fluid in the interior chamber 102. For example, the user can put coffee or tea into the brewing canister 103 along with water in the interior chamber 102 in which the brewing canister 103 is submerged overnight and the device 900 is programmed, via the app, to send the brewing protocol (e.g., with selected brewing parameters) to the device 900 at a specific time, or send it beforehand in which case the data processing unit 106 of the device 900 would have an internal timer to start the brewing process at the desired time. The user can thereby wake up to a freshly brewed cup of tea or coffee in the device 900 without interacting with any of the app on the user device or the device 900 itself, e.g., because the timer can be programmed to finish by the time the user wakes up.

Figure 13B:
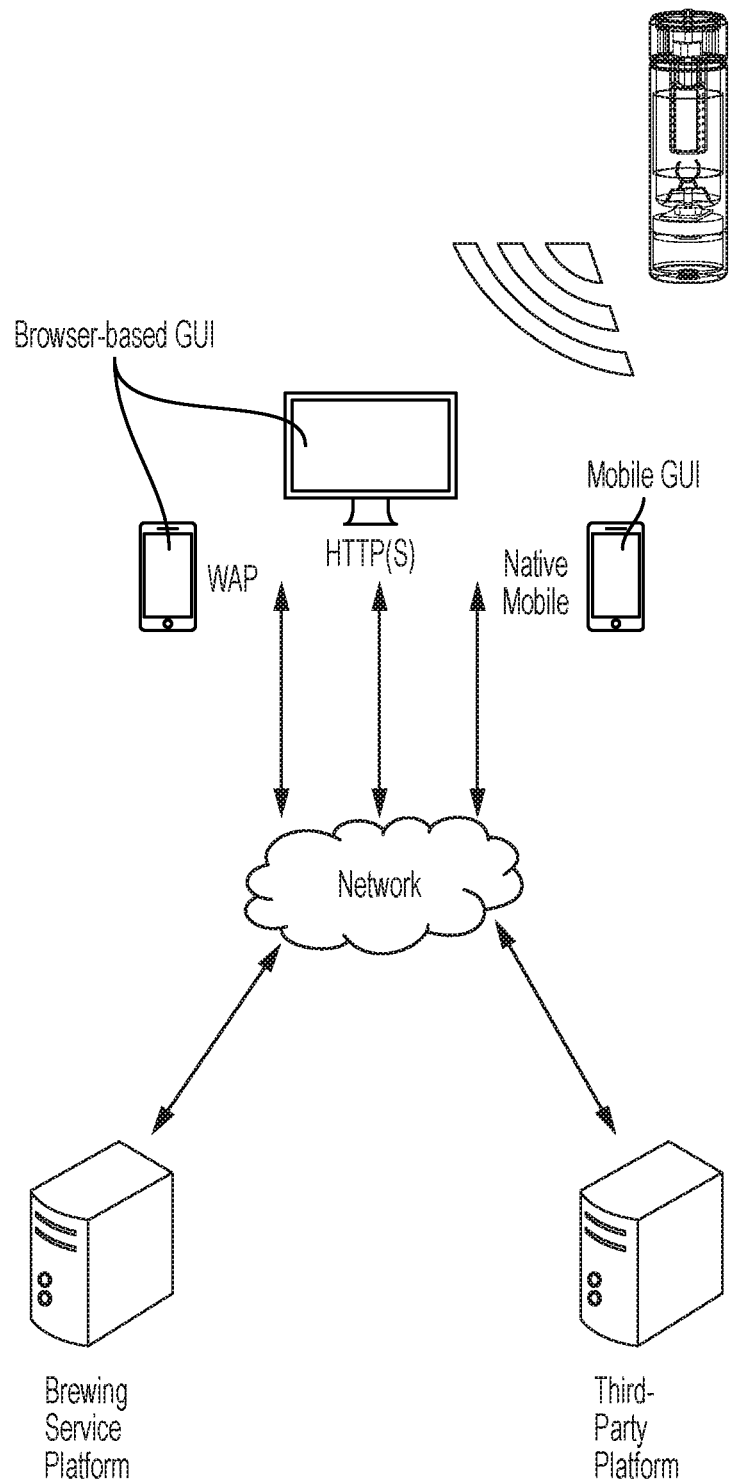
FIG. 13B shows an exemplary cloud-based system wherein a brewing service platform server is in communication with the consumer brewing application described herein and optionally in communication with third-party servers, such as those of coffee or tea vendors.

FIG. 13B shows an exemplary cloud-based system. In this system, a brewing service platform server (e.g., a TEAnGO platform server) is in communication with a consumer brewing application, such as a mobile application (app), described herein. The brewing device is in two-way wireless communication with the a consumer brewing application such that the app optionally sends brewing protocol information to the device and the device optionally sends brewing status information to the app. Further in this system, a brewing service platform server is optionally in communication with third-party servers, such as those of coffee or tea vendors. The third-party server, for example, optionally offer e-commerce features, including convenient ordering of brewing materials and supplies.

In accordance with some example embodiments of the portable brewing devices of the present technology, a portable brewing device is operated as follows. In some operations, for example, a user can insert the beverage material (in the example below, tea) into the brewing canister 103 (e.g., at any time before use of the device, including long before the use of the device to brew the tea). Once the tea is inserted into the inner canister of the brewing canister 103, with a closed cap or lid on the canister 103 as shown in FIG. 5A, the inner canister can be placed inside the outside canister of the brewing canister 103 in the interior region 102, e.g., where the default position is the closed position so that the openings are not aligned and therefore closed off to the water. The user can then add water into the interior region 102. At this point, the user can take the device on the go, or leave it for a later time of use. When the user desires to brew the tea, the user can operate the device to heat the water and allow diffusion of the water into the brewing canister 103 and extraction of compounds from the tea into the water diffusible through the openings of the canister 103 into the interior region 102. For example, in some implementations, the user can select a predetermined program to initiate the data processing unit 106 to activate the heating unit 104, temperature sensor 105, and motor 108, according to the predetermined program. In some implementations, for example, the user can select the program through an external device (e.g., such as a smartphone, tablet, or wearable device) or by manual entry on the device. For example, the program can contain instructions to control the components of the device to operate based on particular brewing parameters of a particular type of tea, e.g., such as heat to a particular brewing temperature, open/close the canister based on a particular brewing duration, and/or maintain a particular holding temperature post brewing. Alternatively or additionally, for example, the program can contain instructions to control the components of the device to heat to a particular brewing temperature, open/close the canister based on a particular brewing duration while simultaneously stirring the fluid through spinning (e.g., which can form a vortex) to get the optimal brewing characteristics, cool the fluid through one of the cooling mechanisms. For example, once the predetermined program is activated, the temperature sensor 105 will provide feedback data to be used for the heating unit 104 (e.g., processed by the data processing unit 106) to achieve the brewing temperature. For example, once the brewing temperature is reached, the canister 103 will be moved to the open position by the motor 108 to allow the water to enter and brew for diffusion of the tea to the interior chamber 102, and in some implementations, the spinning component 118 can spin to stir and mix the water for brewing. In implementations with a manual operation of the canister 103, for example, a display of the temperature or an alert can be provided by the device to inform the user when the temperature is at an appropriate level for the user to open and close the canister 103. For example, once the overall brewing time is achieved, the canister 103 will be closed from the water, and the tea can be consumed when it reaches drinking temperature. The heating unit 104 will be able to maintain this drinking temperature through feedback from the temperature sensor 104. In some implementations, for example, the tea can actively cool (e.g., vortex, Peltier, etc.) or passively allow cooling of the tea in the interior region 102 to reach a drinking temperature.

Figure 14B:
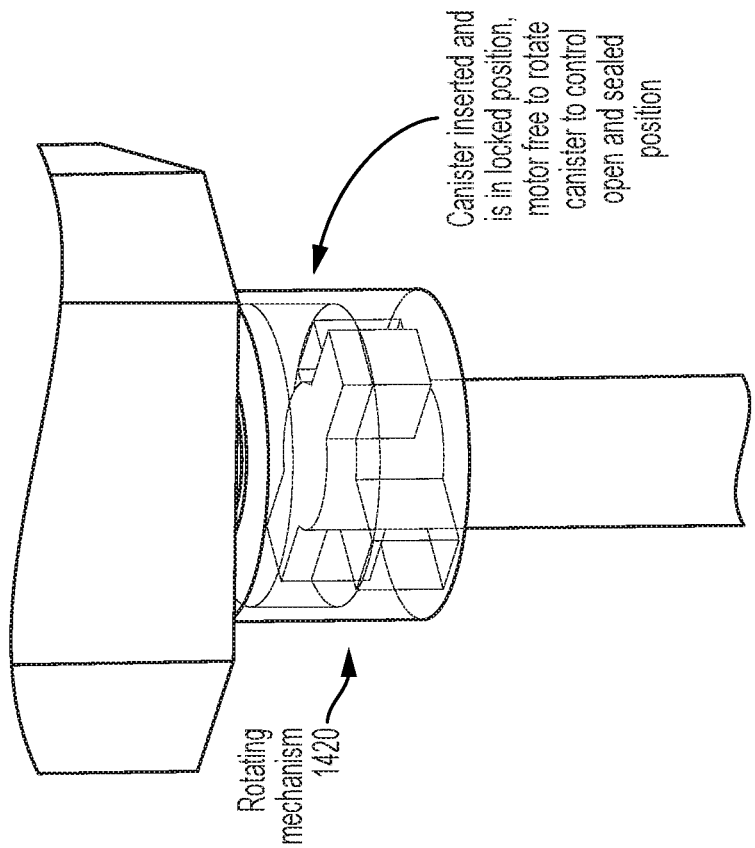
FIGS. 14A and 14B show an illustrative schematic diagram of an example embodiment of the brewing canister connecting to a rotating mechanism.
Figure 14A:
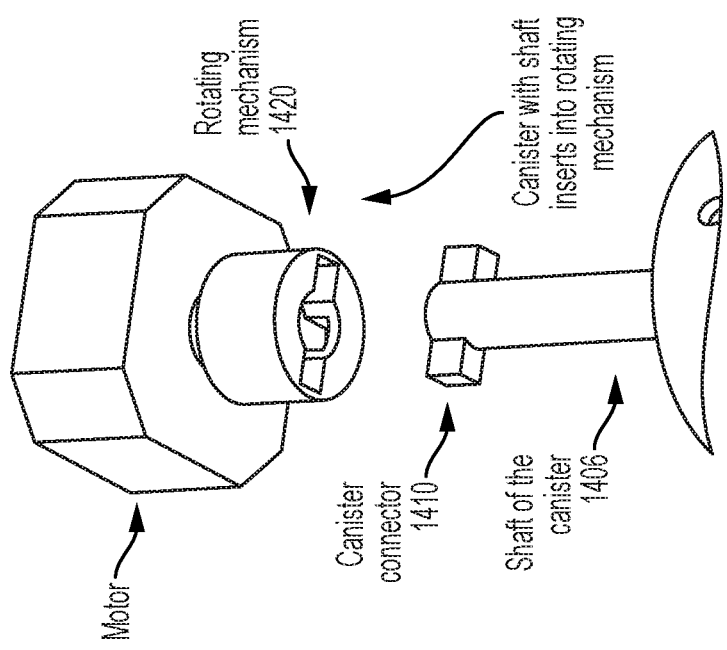

FIGS. 14A and 14B show an example of a linking assembly for attaching the brewing canister to a rotating mechanism 1420 that interacts with a motor to cause the canister to move. The linking assembly includes a shaft 1406 coupled to the canister (e.g., the inner canister), in which the shaft provides a connector component 1410 or feature at the distal end of the shaft to interface with the rotating mechanism 1420. The rotating mechanism 1420 of the linking assembly is operably attached to the motor, such that the motor causes the rotating mechanism 1420 to rotate in a manner controlled by the motor. As shown in FIG. 14A, the brewing canister has the shaft 1406 presently detached from the rotating mechanism 1420, where the connector component 1410 is proximate an opening of the rotating mechanism 1420 structured to receive the connector component 1410. Once the connector component 1410 is inserted within the rotating mechanism 1420, it can be set in a locked position, such that the shaft 1406 is reversibly, but lockably, inserted into the rotating mechanism 1420. In FIG. 14B, the canister connector 1410 is shown as inserted and placed into the locked position such that the brewing canister will not fall out or move unless pushed out. In this embodiment, the canister is removed from the rotating mechanism 1420 by pushing it up into the free space and rotating it 90 degrees. When the canister is placed into the locked position, it allows for precise control of the rotation of the canister, as the rotating mechanism 1420 is moveable by a motor or manual operation. The locked position allows for this precise control of the rotation because the canister will rotate directly with the rotating mechanism 1420 since the canister is unable to move within the rotating mechanism 1420, e.g., there is little free-play in the mechanism. This allows a motor or manual operation to control the rotation of the canister to regulate when the device is in the open (e.g., unsealed) or closed (e.g., sealed) position.

Figure 15:
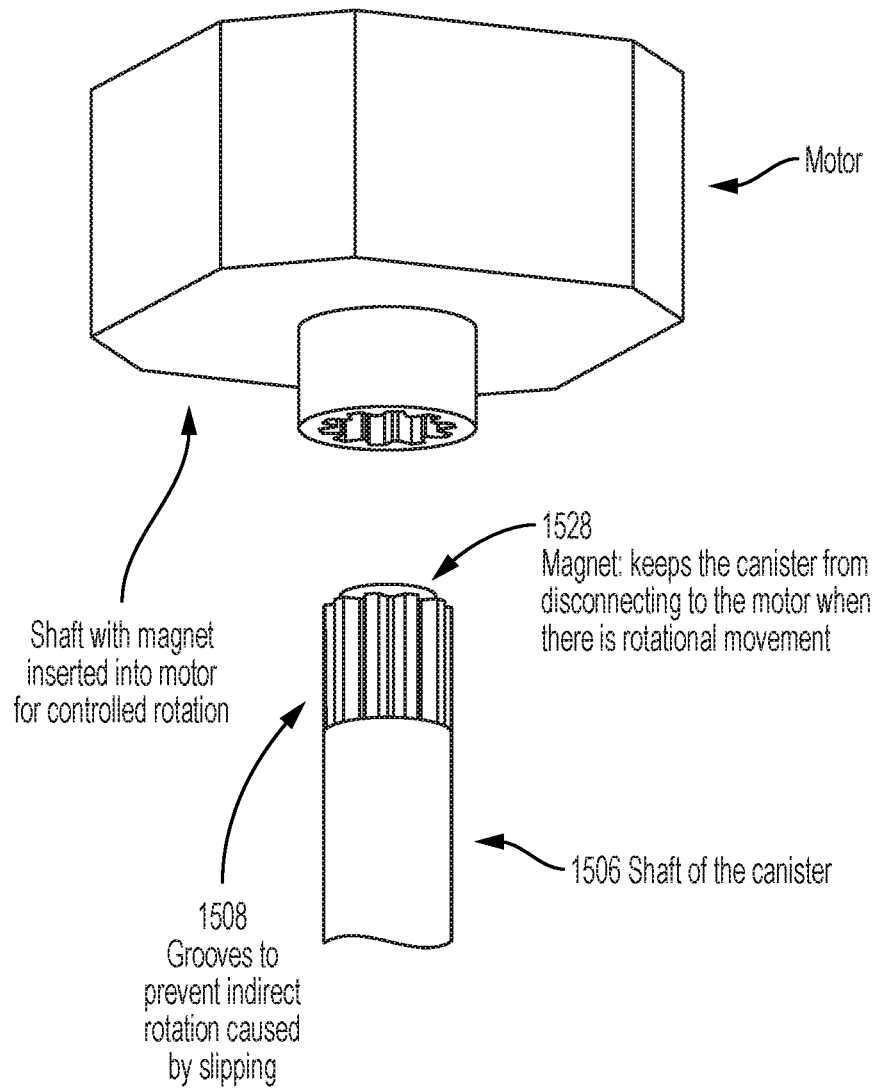
FIG. 15 shows an illustrative schematic diagram of an example embodiment of the brewing canister connecting to a motor.

FIG. 15 shows another example of a linking assembly for attaching the brewing canister directly, but reversibly, to a motor or manual operation mechanism. In this example embodiment of the linking mechanism, the shaft 1506 of the canister optionally comprises grooves 1508 to prevent indirect rotation caused by slipping. Moreover, in some embodiments, the linking mechanism includes an attached magnet 1528 at the end of the shaft 1506 that magnetically interacts with a magnet disposed to the motor to securely connect the shaft 1506 to the motor and keep the canister from undesirably disconnecting. In this embodiment, once the shaft 1506 is inserted into the motor, the magnets keep these two parts together and allow the motor to directly rotate the canister with precision. This is an exemplary embodiment of the way the shaft 1506 of the canister is optionally connected to a motor or mechanism for manual operation in order to precisely control the rotation of the canister to control when the canister is in the open (e.g., unsealed) or closed (e.g., sealed) position.

FIGS. 16A and 16B provide yet another example of an option for attaching the brewing canister to a rotating mechanism, which interacts with a motor or other means of rotation. In FIG. 16A, the shaft 1606 is extended from the motor to the canister and providing the rotating mechanism 1620 at the end of the shaft 1606 to reversibly attach to a connector component 1610 coupled to the canister. The connector is extended from the brewing canister. In FIG. 16B, the connector is shown to be inserted into the rotating mechanism 1620 and turned into the locked position similar to FIG. 14B. This accomplishes the same result as FIG. 14B wherein the canister is locked to the rotating mechanism 1620 and allows the motor to precisely control the rotation of the rotating mechanism 1620 which directly controls the rotation of the canister. This controls when the canister is in the open (e.g., unsealed) or closed (e.g., sealed) position. For example, an advantage of this embodiment over FIGS. 14A and 14B is that the shaft 1606 remains in the device and the canister is removed without the long shaft. This embodiment allows the canister to be smaller in height, easier to handle, and easier to store.

Figure 17:
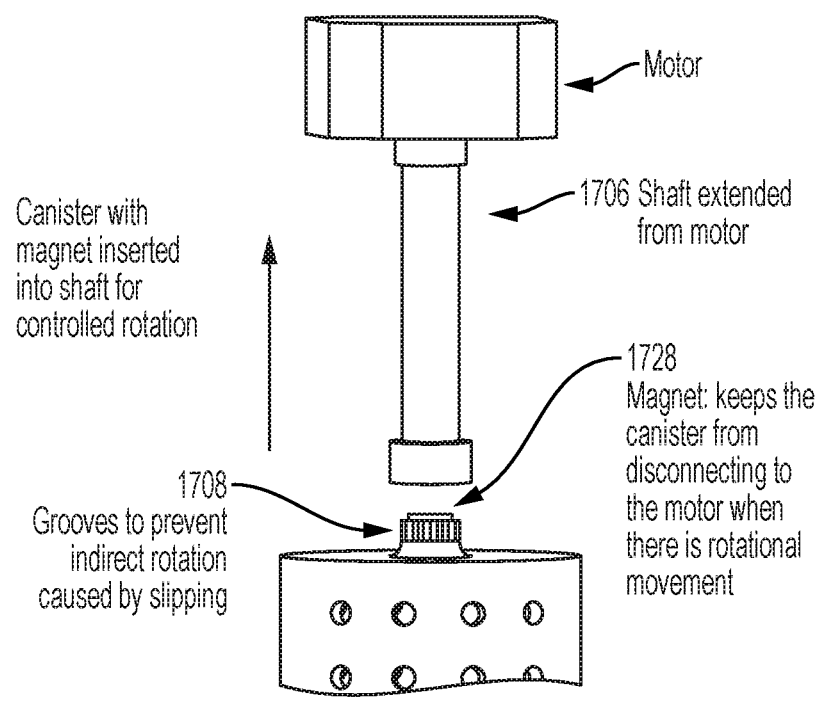
FIG. 17 shows an illustrative schematic diagram of an example embodiment of the brewing canister connecting to a motor.

FIG. 17 shows yet another example of an option for attaching the brewing canister to a motor or manual means of rotation without having a shaft connected to the canister. The brewing canister optionally comprises grooves 1708 preventing indirect rotation, which can be caused by slipping, as well as a magnet 1728 that the keeps the canister from disconnecting from the shaft 1706, which is connected to the motor. In this embodiment, the canister is inserted into the shaft 1706 where the magnets will interact, keep the two parts connected, and allow the motor to directly rotate the canister with precision to control when the canister is in the open (e.g., unsealed) or closed (e.g., sealed) position similar to FIG. 15. For example, an advantage of this embodiment is that the shaft 1706 remains in the device and the canister is inserted and removed more easily than using a rotating mechanism since it is one step that requires force applied in a single direction to insert and remove it. This embodiment also allows the canister to be smaller in height, easier to handle, and easier to store.

Figure 18A:
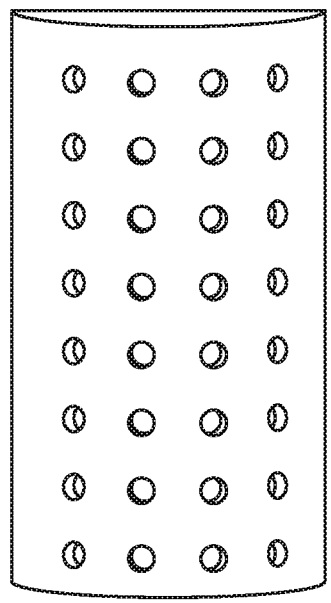
FIGS. 18A and 18B show an illustrative schematic diagram of an example embodiment of the variations of the brewing canister for specific uses.
Figure 18B:
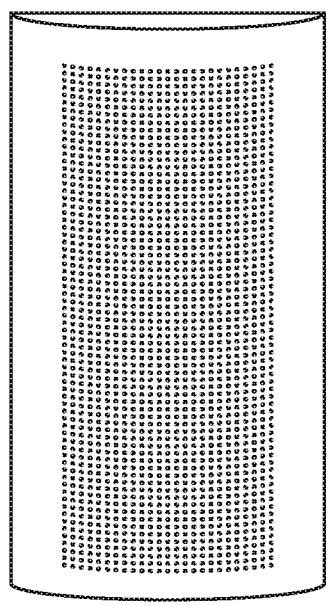

FIGS. 18A and 18B show an example embodiment of two different versions of the brewing canister where the difference is the number of holes as well as the hole sizes. FIG. 18A is an embodiment where there are fewer holes and the hole sizes are larger than in FIG. 18B, which in an embodiment with more holes and the hole sizes are small. The brewing canister suitably comes in many different versions that includes, but is not limited to, the following changes in parameters: hole position, hole size, the number of holes, and hole geometry. Changing these parameters allows the canisters to be optimized for specific types of brewing materials depending on the desired outcome.

Many hole sizes are suitable to achieve various desired filtration and fluid flow properties. By way of non-limiting examples, suitable hole sizes include, 0.5, 1, 2, 3, 4, 5, 6, 7, 8, 9, 10, 15, 20, 25, 30, 35, 40, 45, 50, 55, 60, 65, 70, 75, 80, 85, 90, 95, and 100 micrometers, including increments therein. By way of further non-limiting examples, suitable hole sizes include, 100, 150, 200, 250, 300, 350, 400, 450, 500, 550, 600, 650, 700, 750, 800, 850, 900, 950, and 1000 micrometers, including increments therein. By way of still further non-limiting examples, suitable hole sizes include, 0.25, 0.5, 0.75, 1, 1.25, 1.5, 1.75, 2, 2.25, 2.5, 2.75, and 3 millimeters, including increments therein. Many hole geometries are suitable to achieve various desired filtration and fluid flow properties. By way of non-limiting examples, suitable hole geometries include, round, rectangular, square, triangular, irregular, oblong, star-shaped, and the like. In some embodiments, the holes in the inner canister and the outer canister correspond (e.g., are the same or similar) in terms of number, spacing, size and/or shape. In other embodiments, the holes in the inner canister and the outer canister differ, at least to some extent, in terms of number, spacing, size and/or shape.

By way of example, a canister comprising large holes such as FIG. 18A is optimized to hold loose-leaf tea since the holes are smaller than the loose-leaf and therefore will act as a filter that will prevent the loose-leaf from entering the interior chamber. In some embodiments, the holes are configured to have a diameter of 10 micrometers to 1.5 millimeters.

By way of further example, a canister comprising a large number of very small holes such as FIG. 18B, where the hole sizes are smaller than coffee grinds, allows coffee grinds to be placed into the canister but will prevent the coffee grinds from entering the interior chamber. In some embodiments, the holes are configured to have a diameter of 1 micrometer to 0.5 millimeter.

The scope of the subject matter described herein includes kits. The kits include a portable brewing device, as described herein, and a plurality of interchangeable brewing canisters, such as a set of canisters. The set of canisters includes canisters optimized, by fine-tuning hole number, hole size, hole spacing, and hole geometry to control degree of filtration of the brewing material, the flow of fluid into and out of the brewing canister, and the like, to achieve desired brewed beverage qualities. Furthermore, a canister or set of canisters is structured to prevent brewing material from exiting the canister or canister region and entering the interior of the chamber where the brewing canister is disposed.

Figure 19:
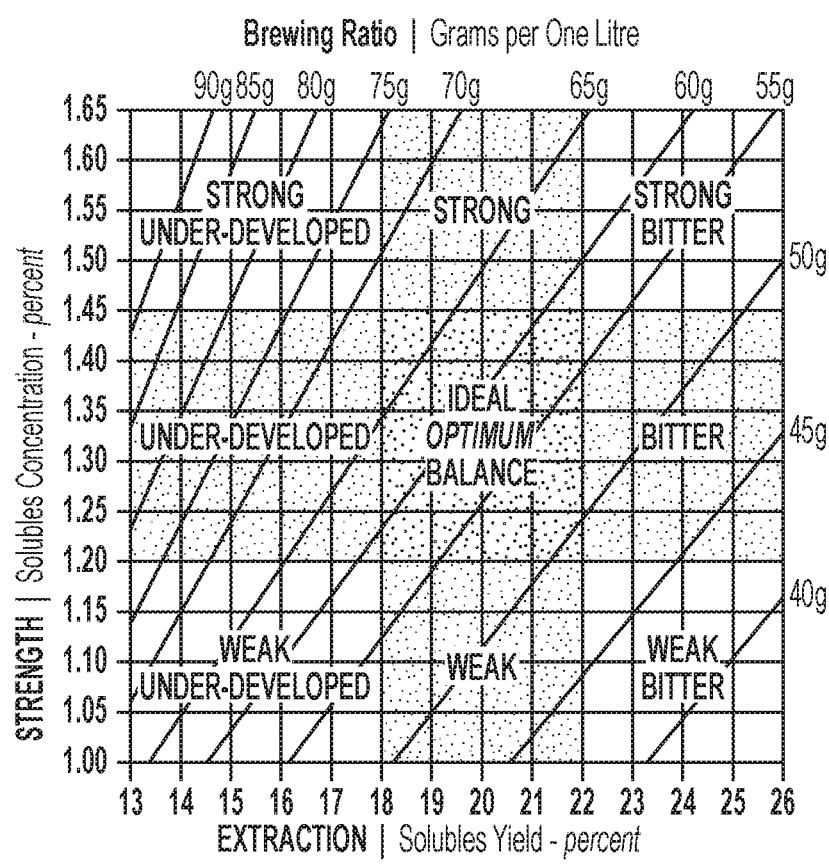
FIG. 19 shows illustrative diagrams of the way in which different users can obtain their optimal balance of extraction for their brewing material from the percentage extraction of soluble which can vary based on type of beverage, temperature, brew times, and other factors.

FIG. 19 is a diagram illustrating brewing parameters, which when varied, modify the qualities of brewed beverages. FIG. 19 illustrates how variations in strength (e.g., soluble concentration) and extraction (e.g., soluble yield), together considered the brewing ratio, affect the outcome. For example, if a brewed beverage has a high soluble yield percentage (e.g., 24 percent), it will be a bitter beverage. If a brewed beverage has a low soluble yield percentage (e.g., 15 percent), it will be an underdeveloped beverage. With a soluble yield percentage in between (e.g., 20 percent), it would be at the optimal balance. The same can be said for the strength where a low percentage would be weak, a high percentage would be strong, and an in between percentage would be ideal. The brewing ratio, expressed in grams per one liter, affects which quadrants of the diagram the brewed beverage will fall in, for example, 40 grams per one liter will become very bitter before it will become in the optimal strength, 90 grams per one liter will become very strong before it will become developed, and 55 grams per one liter will be weak and under developed, or ideal and optimal balance, or strong and bitter.

FIG. 19 illustrates how to achieve different outcomes for a brewed beverage, however, the size and range of the quadrants as well as the slope and intersections of the lines vary for different beverages. The factors that affect the graph for a beverage include the temperature, the brew time, as well as other factors such as the movement of water. The temperature of the fluid affects the rate in which the compounds in the brewing material solubilize. Different compounds solubilize at a different rate. For example, caffeine solubilizes very quickly compared to the volatile oils in coffee, which solubilize more slowly, while organic acids solubilize even more slowly than volatile oils. Different brewing materials have different compounds, and since temperature affects the solubility rate of these compounds, it has an effect on the level of compounds in the fluid. The brewing time affects the level of extraction of each compound since each compound has an amount of compound relative to the time profile. The circulation of water also has an effect on the amount of compound extracted since it increases the concentration gradient of these compounds thereby allowing more compounds to be extracted with a shorter amount of time. These parameters determine the quadrant of FIG. 19 that the beverage will fall into, depending on the type of brewing material. Different users may have different preferences for the point on the graph in FIG. 19 depending on the beverage. For instance, a user may prefer one type of tea strong but underdeveloped while they also enjoy their coffee strong and bitter. These preferences allow a user to choose what they believe is an optimal beverage. This gives rise to differences in opinion on what the optimal parameters are for specific beverages. For example, some believe that 175 degrees Fahrenheit, 1.5 tablespoon for 8 ounces, and 5 minutes is the optimal temperature, amount, and brew time for white tea, while others believe 160 degrees Fahrenheit, 1.5 tablespoons for 8 ounces, and 3 minutes is the optimal temperature, amount, and brew time for white tea. Therefore, precisely controlling the amount of material, temperature, brew time, and the circulation of water will give every user the ability to achieve what they believe is their optimal beverage. The brewing canister described herein, is designed to hold a specific amount of brewing material, precisely control when it brews, and precisely control how long it brews. Moreover, combined with circulation of water, achieved through the spinning mechanism, a user is able to achieve the results they want for every type of beverage.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile OS, Linux®, and Palm WebOS®. Those of skill in the art will also recognize that suitable media streaming device operating systems include, by way of non-limiting examples, Apple TV®, Roku®, Boxee®, GoogleTV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user information, pre-configured brewing protocols, and consumer-configured custom brewing protocols. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following examples are illustrative of several embodiments of the present technology. Other exemplary embodiments of the present technology may be presented prior to the following listed examples or after the following listed examples.

In one example of the present technology (Example 1), a device for brewing a beverage includes a container body structured to include an opening at one end to an interior chamber inside the container body to contain a fluid; a brewing canister located in the interior chamber and structured to include an inner canister and an outer canister each including openings, in which the inner and outer canisters are operable to rotate such that the openings align in an open position of the brewing canister or unalign in a closed position of the brewing canister; a heating unit to generate heat into the interior chamber; and an actuator to rotate one or both of the inner canister and outer canister to the open position and the closed position, such that when fluid is contained in the interior chamber, the fluid is able to flow in and out of the brewing canister when in the open position and is unable to flow in and out of the brewing canister when in the closed position, in which the device is operable to store a solid substance in the brewing canister and control fluid flow to brew the solid substance.

Example 2 includes the device of Example 1, further including a data processing unit including a processor to process data and a memory to store or buffer data, in which the data processing unit is in communication with the heating unit to control the operation of the heating unit.

Example 3 includes the device of Example 2, further including a temperature sensor to detect a temperature of the fluid in the interior chamber.

Example 4 includes the device of Example 3, in which the data processing unit is configured to receive temperature data from the temperature sensor and regulate the temperature of the fluid based on the detected temperature to cause the heating unit to generate the heat to a particular temperature.

Example 5 includes the device of Example 2, in which the actuator includes a motor in communication with the data processing unit.

Example 6 includes the device of Example 5, in which the data processing unit is configured to control the motor to rotate to the open position or the closed position.

Example 7 includes the device of Example 2, further including a display on the exterior of the container body and in communication with the data processing unit, in which the display is configured to display data associated with temperature of the fluid, or a time of brewing, or both.

Example 8 includes the device of Example 1, in which the inner canister is insertable inside the outer canister, and the brewing canister includes a cap to attach to and detach from the inner canister.

Example 9 includes the device of Example 1, further including a detachable lid to cover the opening, the detachable lid including an aperture and an aperture cover to allow the fluid to flow out of the interior compartment when the lid is attached to the container body.

Example 10 includes the device of Example 1, further including a detachable housing compartment to connect to the container body, the detachable housing compartment including a hollow interior region to store items within.

Example 11 includes the device of Example 1, in which the actuator includes a manual lever coupled to the inner canister and a knob on the exterior of the container body to allow a user to actuate the brewing canister between the open and closed positions.

In one example of the present technology (Example 12), a device for brewing a beverage includes a container body structured to include an opening at one end to an interior chamber inside the container body to contain a fluid; a brewing canister located in the interior chamber and structured to include an inner canister and an outer canister each including openings, in which the inner and outer canisters are operable to rotate such that the openings align in an open position of the brewing canister or unalign in a closed position of the brewing canister; a heating unit to generate heat into the interior chamber; a cooling unit to cool the fluid in the interior chamber; and an actuator to rotate one or both of the inner canister and outer canister to the open position and the closed position, such that when fluid is contained in the interior chamber, the fluid is able to flow in and out of the brewing canister when in the open position and is unable to flow in and out of the brewing canister when in the closed position, in which the device is operable to store a solid substance in the brewing canister and control fluid flow to brew the solid substance.

Example 13 includes the device of Example 12, in which the cooling unit includes a spinning apparatus to create a vortex of the fluid in the interior chamber generating a forced convection.

Example 14 includes the device of Example 12, in which the cooling unit includes a spinning apparatus to cool the fluid in the interior chamber through a Peltier effect.

Example 15 includes the device of Example 12, further including a data processing unit including a processor to process data and a memory to store or buffer data, in which the data processing unit is in communication with the heating unit and cooling unit to control operations of the heating unit and the cooling unit, respectively.

Example 16 includes the device of Example 15, further including a temperature sensor to detect a temperature of the fluid in the interior chamber.

Example 17 includes the device of Example 16, in which the data processing unit is configured to receive temperature data from the temperature sensor and regulate the temperature of the fluid based on the detected temperature to cause the heating unit to generate the heat to a particular temperature.

Example 18 includes the device of Example 16, in which the data processing unit is configured to receive temperature data from the temperature sensor and regulate the temperature of the fluid based on the detected temperature to cause the cooling unit to cool the fluid to a particular temperature.

Example 19 includes the device of Example 15, in which the actuator includes a motor in communication with the data processing unit.

Example 20 includes the device of Example 19, in which the data processing unit is configured to control the motor to rotate to the open position or the closed position.

Example 21 includes the device of Example 15, further including a display on the exterior of the container body and in communication with the data processing unit, in which the display is configured to display data associated with temperature of the fluid, or a time of brewing, or both.

Example 22 includes the device of Example 12, in which the inner canister is insertable inside the outer canister, and the brewing canister includes a cap to attach to and detach from the inner canister.

Example 23 includes the device of Example 12, further including a detachable lid to cover the opening, the detachable lid including an aperture and an aperture cover to allow the fluid to flow out of the interior compartment when the lid is attached to the container body.

Example 24 includes the device of Example 12, further including a detachable housing compartment to connect to the container body, the detachable housing compartment including a hollow interior region to store items within.

Example 25 includes the device of Example 12, in which the actuator includes a manual lever coupled to the inner canister and a knob on the exterior of the container body to allow a user to actuate the brewing canister between the open and closed positions.

In one example of the present technology (Example 26), a user loads a desired amount of loose-leaf tea into the brewing chamber of the portable beverage brewing device described herein and adds a desired amount of water to the interior chamber of the container body. To do this, the user removes the top of the device, disengaging the actuator, to remove the brewing canister. The user removes a cap from the bottom of the brewing canister to provide access to the brewing chamber, loads the tea into the chamber, and replaces the cap. With the brewing canister out of the device, the interior chamber of the container body is accessible. The user pours the water into the interior chamber, reseats the canister, and reseats the top of the device.

Example 27 includes the process of Example 26, wherein after the user loads the tea and water, the user opens application, described herein, on their smartphone to select a hot-brewed tea brewing protocol (including a desired drinking temperature), sets a timer to the time they want to wake up, and leaves the device on their bedside table. The user desires a warm-brewed beverage upon waking, so the brewing canister stays in a closed position all night until right before the time they want to wake up, wherein the amount of time would be equal or greater than the time it takes the device to heat the water, open the brewing canister, brew the beverage, and cool it to the user's desired drinking temperature. Upon waking, the user has a fresh cup of tea, at their ideal drinking temperature, which they can enjoy in bed.

Example 28 includes the process of Example 26, wherein after the user loads the tea and water, the user opens application, described herein, on their smartphone to select a cold-brewed tea brewing protocol (including a desired drinking temperature), sets a timer to the time they want to wake up, and leaves the device on their bedside table. The user desires a cold-brewed beverage upon waking, so the brewing canister stays in a closed position all night until right before the time they want to wake up, wherein the amount of time would be equal or greater than the time it takes the device to open the brewing canister, brew the beverage, and heat it to the user's desired drinking temperature. Upon waking, the user has a fresh cup of tea, at their ideal drinking temperature, which they can enjoy in bed.

Example 29 includes the process of Example 26, wherein after the user loads the tea and water, the user opens application, described herein, on their smartphone to initiate a tea brewing protocol (including a desired drinking temperature) and gets into their car for a long drive. The user desires a warm-brewed beverage for their drive. The device automatically brews the tea without the user interacting with the device at all. The hands-free brewing experience allows them to stay focused while driving. The user enjoys their drink at their ideal drinking temperature, does not have to worry about making a mess in their car, does not worry about burning their mouth, and does not get distracted from driving.

Example 30 includes the process of Example 26, wherein after the user loads the tea and water, the user opens application, described herein, on their smartphone to custom-configure and initiate a tea brewing protocol (including a brewing time, a brewing temperature, and a drinking temperature) and sets out for a walk to work. The user desires a warm-brewed beverage when they reach their workplace. The device automatically brews the tea, without the user interacting with the device, while they are walking with it in their backpack.

Example 31 includes the process of Example 26, wherein after the user loads the tea and water, the user opens application, described herein, on their smartphone to select and initiate a pre-configured tea brewing protocol, places the device on their desk at work, and begins to check their email. The user desires a warm-brewed beverage at the start of their workday. The device automatically heats the water, brews the beverage, cools it to their ideal drinking temperature, and notifies the user when it is ready. The user does not have to get distracted from their work to worry about the brewing, dump out the brewing material, guess when the tea has cooled to their ideal temperature by sipping it (potentially burning their tongue). This worry-free process allows the worker to be focused and productive and have an ideal cup made right next to them.

In one example of the present technology (Example 32), a user loads a desired amount of ground coffee into the brewing chamber of a tabletop beverage brewing device described herein and adds a desired amount of water to an interior chamber of a container of the device. To do this, the user opens the device and removes the brewing canister. The user removes a cap from the bottom of the brewing canister to provide access to the brewing chamber, loads the coffee into the chamber, and replaces the cap. With the brewing canister out of the device, the interior chamber of the container body is accessible. The user pours the water into the interior chamber, reseats the canister, and closes the device.

In one example of the present technology (Example 33), a user loads four different tea pods into the brewing chambers of a multi-chamber brewing canister of the portable beverage brewing device described herein. The user then adds enough water for four cups of tea to the interior chamber of the container body. To do this, the user removes the top of the device, disengaging the actuator, to remove the brewing canister. The user removes a cap from the bottom of the brewing canister to provide access to the brewing chambers, loads the tea pods into the chambers, and replaces the cap. With the brewing canister out of the device, the interior chamber of the container body is accessible. The user pours the water into the interior chamber, reseats the canister, and reseats the top of the device. After the user loads the tea pods and water, the user opens application, described herein, on their smartphone to select a hot-brewed tea brewing protocol for each of the tea pods and initiates the protocols, which run one after another on each of the pods to produce four uniquely tailored cups of tea.

Implementations of the subject matter and the functional operations described in this patent document are optionally implemented in various systems, digital electronic circuitry, or in computer software, firmware, or hardware, including the structures disclosed in this specification and their structural equivalents, or in combinations of one or more of them. Implementations of the subject matter described in this specification are optionally implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) is optionally written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is optionally deployed for execution on one computer or on multiple computers that are located at one site or distributed across multiple sites and interconnected by a communication network.

The processes and logic flows described in this specification are optionally performed by one or more programmable processors executing one or more computer programs to perform functions by operating on input data and generating output. The processes and logic flows can also be performed by, and apparatus are also optionally implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example, semiconductor memory devices, e.g., EPROM, EEPROM, and flash memory devices. The processor and the memory can be supplemented by, or incorporated in, special purpose logic circuitry.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated. Any reference to "exemplary" herein is intended to encompass "example" unless otherwise stated.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A portable beverage brewing device comprising:
   a container body open at one end and forming an interior chamber configured to contain a fluid;
   a spinning apparatus contained in the interior chamber of the container body;
   a lid; and
   a brewing canister positioned in the interior chamber, the brewing canister comprising:
      an inner canister comprising at least one opening; and
      an outer canister comprising at least one opening;
      the inner canister positioned within the outer canister to form a brewing chamber; the inner canister, the outer canister, or both rotatable such that the at least one opening of the inner canister and the at least one opening of the outer canister align in an open position or unalign in a closed position; and
      wherein the lid comprises an actuator operable to rotate the inner canister, the outer canister, or both to modulate between the open position and the closed position, such that the fluid is able to flow in and out of the brewing chamber when in the open position and is unable to flow in and out of the brewing chamber when in the closed position;
   the device operable to contain a brewing material in the brewing chamber and regulate fluid flow between the interior chamber and the brewing chamber to brew the brewing material.

2. The device of claim 1, further comprising a data processing unit including a processor to process data and a memory to store or buffer data.

3. The device of claim 2, further comprising a heating unit and the data processing unit is in communication with the heating unit to control the operation of the heating unit to heat the fluid.

4. The device of claim 3, wherein the heating unit comprises a Peltier device.

5. The device of claim 2, further comprising a temperature sensor to detect a temperature of the fluid in the interior chamber, wherein the data processing unit is configured to receive temperature data from the temperature sensor and regulate the temperature of the fluid based on the detected temperature.

6. The device of claim 2, wherein the actuator comprises a motor or a servo in communication with the data processing unit and wherein the data processing unit is configured to control the motor or servo to modulate the brewing canister between the open position and the closed position.

7. The device of claim 2, further comprising a cooling unit and the data processing unit is in communication with the cooling unit to control the operation of the cooling unit to cool the fluid.

8. The device of claim 7, wherein the cooling unit comprises a spinning apparatus to generate forced convection, a Peltier device, or both a spinning apparatus and a Peltier device.

9. A portable beverage brewing platform comprising:
   a portable beverage brewing device comprising: a container body open at one end and forming an interior chamber configured to contain a fluid; a lid; and a brewing canister positioned in the interior chamber, the brewing canister comprising:
      an inner canister comprising at least one opening and an outer canister comprising at least one opening; the inner canister positioned within the outer canister and having a common rotational axis with the outer canister to form a brewing chamber configured to contain a brewing material; the inner canister, the outer canister, or both rotatable such that the at least one opening of the inner canister and the at least one opening of the outer canister align in an open position or unalign in a closed position;
      a spinning apparatus contained in the interior chamber of the container body; and
      wherein the lid comprises an actuator configured to rotate the inner canister, the outer canister, or both to modulate between the open position and the closed position, such that the fluid located in the interior chamber is able to flow in and out of the brewing chamber when in the open position and is unable to flow in and out of the brewing chamber when in the closed position;
   a mobile processor configured to provide a mobile consumer beverage brewing application comprising:
      a software module presenting a user interface allowing the consumer to select a pre-configured brewing protocol or configure a custom brewing protocol, wherein each brewing protocol comprises a brew temperature, a movement of the spinning apparatus, and a brew time; and
      a software module wirelessly transmitting the selected pre-configured brewing protocol or the consumer-configured custom brewing protocol to the portable beverage brewing device to regulate fluid flow to the brewing chamber to brew the brewing material.

10. The platform of claim 9, wherein the portable beverage brewing device further comprises a spinning apparatus in the interior chamber configured to stir the fluid and wherein each brewing protocol further comprises: when a spinning apparatus is initiated, the speed of a spinning apparatus, and the length of time of a spinning apparatus operates.

11. The platform of claim 9, wherein each brewing protocol further comprises a drinking temperature.

12. The platform of claim 9, wherein each brewing protocol further comprises when a brewing sequence is initiated and a speed of protocol execution.

13. The platform of claim 9, wherein the application further comprises a software module presenting a user interface allowing the consumer to schedule a start time for the selected pre-configured brewing protocol or the consumer-configured custom brewing protocol.

14. A brewing canister for a beverage brewing device, the brewing canister comprising:
   a lid;

an inner canister comprising at least one opening;
an outer canister comprising at least one opening;
the inner canister positioned at least partially within the outer canister and having a common rotational axis with the outer canister to form a brewing chamber configured to contain a brewing material; the inner canister, the outer canister, or both rotatable such that the at least one opening of the inner canister and the at least one opening of the outer canister align in an open position or unalign in a closed position;
a spinning apparatus;
wherein the lid comprises an actuator operable to rotate the inner canister, the outer canister, or both to modulate between the open position and the closed position, such that fluid located outside the brewing canister is able to flow in and out of the brewing chamber when in the open position and is unable to flow in and out of the brewing chamber when in the closed position; and
a data processing unit including a processor to process data and a memory to store or buffer data, the data processing unit configured to send an alert pertaining to manual operation of the brewing canister actuator between the open position and the closed position to regulate flow of the fluid in and out of the brewing chamber to brew the brewing material.

15. The device of claim 14, further comprising a heating unit, wherein the data processing unit is in communication with the heating unit to control the operation of the heating unit to heat the fluid.

16. The device of claim 15, wherein the heating unit comprises a Peltier device.

17. The device of claim 14, further comprising a temperature sensor to detect a temperature of the fluid in the interior chamber, wherein the data processing unit is configured to receive temperature data from the temperature sensor wherein the temperature determines when the alert is given.

18. The device of claim 14, further comprising sensors to detect conditions of the fluid in the interior chamber, wherein the data processing unit is in communication with the sensors.

19. The device of claim 14, further comprising a spinning apparatus in the interior chamber in communication with the data processing unit and configured to stir the fluid, cool the fluid, or both stir the fluid and cool the fluid.

20. The device of claim 19, further comprising sensors to detect conditions of the fluid in the interior chamber, wherein the data processing unit is in communication with the sensors.

21. A portable beverage brewing platform comprising:
a portable beverage brewing device comprising: a container body open at one end and forming an interior chamber configured to contain a fluid; a lid; and a brewing canister positioned in the interior chamber such that the brewing canister is at least partially submerged when the interior chamber contains a fluid, the brewing canister comprising:
an inner canister comprising at least one opening and an outer canister comprising at least one opening; the inner canister positioned within the outer canister and having a common rotational axis with the outer canister to form a brewing chamber configured to contain a brewing material; the inner canister, the outer canister, or both rotatable such that the at least one opening of the inner canister and the at least one opening of the outer canister align in an open position or unalign in a closed position;
wherein the lid comprises an actuator configured to rotate the inner canister, the outer canister, or both between the open position and the closed position, such that the fluid located in the interior chamber is able to flow in and out of the brewing chamber when in the open position and is unable to flow in and out of the brewing chamber when in the closed position;
a data processing unit including a processor to process data and a memory to store or buffer data, the data processing unit configured to send a control signal to the actuator to rotate the inner canister, the outer canister, or both the inner canister and the outer canister, between the open position and the closed position to regulate flow of the fluid in and out of the brewing chamber to brew the brewing material, wherein the actuator comprises a motor or a servo in communication with the data processing unit and wherein the control signal causes the motor or servo to rotate the inner canister, the outer canister, or both the inner canister and the outer canister between the open position and the closed position; and a spinning apparatus in the interior chamber configured to stir the fluid and wherein each brewing protocol further comprises: when a spinning apparatus is initiated, the speed of a spinning apparatus, and the length of time of a spinning apparatus operates; and
a mobile processor configured to provide a mobile consumer beverage brewing application comprising:
a software module presenting a user interface allowing the consumer to select a pre-configured brewing protocol or configure a custom brewing protocol, wherein each brewing protocol comprises a brew temperature, a movement of the spinning apparatus, and a brew time; and
a software module wirelessly transmitting the selected pre-configured brewing protocol or the consumer-configured custom brewing protocol to the portable beverage brewing device.

22. The platform of claim 21, wherein each brewing protocol further comprises a drinking temperature.

23. The platform of claim 21, wherein each brewing protocol further comprises when a brewing sequence is initiated and a speed of protocol execution.

24. The platform of claim 21, wherein the application further comprises a software module presenting a user interface allowing the consumer to schedule a start time for the selected pre-configured brewing protocol or the consumer-configured custom brewing protocol.

* * * * *